US012785509B2

(12) United States Patent
Nahrwold et al.

(10) Patent No.: US 12,785,509 B2
(45) Date of Patent: Nov. 3, 2026

(54) SCALLOP SHAPED OIL INLET ROTOR SHAFT DESIGN FOR MOTOR AND BEARING COOLING

(71) Applicant: Dana Automotive Systems Group, LLC, Maumee, OH (US)

(72) Inventors: Tom Nahrwold, Napolean, OH (US); Brian Sitterly, Norwalk, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 267 days.

(21) Appl. No.: 18/795,689

(22) Filed: Aug. 6, 2024

(65) Prior Publication Data

US 2026/0045848 A1 Feb. 12, 2026

(51) Int. Cl.

| | |
|---|---|
| ***H02K 9/19*** | (2006.01) |
| ***H02K 9/00*** | (2006.01) |
| *B60K 6/26* | (2007.10) |
| *F16C 37/00* | (2006.01) |
| *H02K 5/173* | (2006.01) |

(52) U.S. Cl.

CPC ................. *H02K 9/19* (2013.01); *H02K 9/00* (2013.01); *B60K 6/26* (2013.01); *B60Y 2200/92* (2013.01); *B60Y 2400/60* (2013.01); *F16C 37/005* (2013.01); *F16C 2380/26* (2013.01); *H02K 5/1732* (2013.01)

(58) Field of Classification Search

CPC .............. H02K 9/00; H02K 9/02; H02K 9/04; H02K 9/06; H02K 9/08; H02K 9/10; H02K 9/12; H02K 9/14; H02K 9/16; H02K 9/18; H02K 9/19; H02K 1/20; H02K 5/1732; H02K 1/32; F16C 37/005; F16C 2380/26; B60K 6/26; B60Y 2200/92; B60Y 2400/60

USPC ................................ 310/52, 54, 58, 59, 60 A

See application file for complete search history.

(56) References Cited

U.S. PATENT DOCUMENTS

| | | | | |
|---|---|---|---|---|
| 7,931,407 | B2 | 4/2011 | Begin et al. | |
| 8,492,941 | B2 | 7/2013 | Endo | |
| 8,901,789 | B2 * | 12/2014 | Zook | H02K 9/19 310/58 |
| 10,790,725 | B2 | 9/2020 | Paul et al. | |
| 11,125,315 | B2 | 9/2021 | Graves et al. | |
| 11,137,060 | B2 | 10/2021 | Dellal et al. | |
| 2007/0273228 | A1 * | 11/2007 | Tanaka | H02K 9/227 310/90 |
| 2011/0214947 | A1 | 9/2011 | Tuomas | |
| 2012/0013206 | A1 * | 1/2012 | Meyer | H02K 1/32 29/596 |
| 2021/0317907 | A1 | 10/2021 | Paoff et al. | |
| 2023/0061459 | A1 | 3/2023 | Rudert et al. | |

FOREIGN PATENT DOCUMENTS

| | | | |
|---|---|---|---|
| CN | 112049923 | B | 11/2022 |
| DE | 102017218351 | A1 | 4/2019 |
| DE | 102020103875 | A1 | 8/2021 |

(Continued)

*Primary Examiner* — Alexander A Singh

(74) *Attorney, Agent, or Firm* — McCoy Russell LLP

(57) ABSTRACT

A lubrication distribution system comprising: a shaft comprising a scalloped shaped portion including a plurality of scalloped recesses configured to receive fluid and distribute the fluid to bearings of a traction motor, where radii of the scalloped recesses vary; and a plurality of distribution holes positioned proximate a circumference of the scalloped shaped portion.

20 Claims, 10 Drawing Sheets

(56) References Cited

FOREIGN PATENT DOCUMENTS

| | | | |
|---|---|---|---|
| EP | 3028888 | B1 | 9/2017 |
| JP | 6609704 | B2 | 11/2019 |

* cited by examiner

SCALLOP SHAPED OIL INLET ROTOR SHAFT DESIGN FOR MOTOR AND BEARING COOLING

TECHNICAL FIELD

The present description relates generally to a rotor incorporating a portion with a scallop shape. The recesses of scallop shape portion collect incoming oil in a defined radius and transfers the oil to distributing holes and passages of a rotor shaft. The recesses may be comprised by the material of the rotor. The rotor does not incorporate an internal tube or tubing to transport or distribute fluid.

BACKGROUND AND SUMMARY

Vehicles, such as electrified vehicles, may incorporate a mover including a rotor and a stator. An electrified vehicle, such as a hybrid vehicle or a fully electric vehicle (EV), may use an electric machine such as a motor for power to drive a vehicle in a direction. The vehicle may use an electric machine as a motor or as a generator. The electric machine may include a rotor and a stator. The stator may be rotationally coupled to an output of the electric machine, such as a shaft or a drive. The electric machine may be an alternating current electric machine that has magnets built into the interior of the rotor, such as an internal permanent magnet motor (IPM). For an IPM, each magnetic pole on the rotor is conventionally created by physically permanent magnets about or within the rotor. An alternating current in the windings of material, such as wiring, of a stator about the rotor core may place force on the magnets. The electromagnetic force generated by the windings may force a shaft and the other components of the rotor to spin about an axis. The spinning of the rotor converts the electromagnetic energy into rotational energy in the form of torque. Alternatively, the electric machine may be an alternating current motor that may not be an IPM, such as a motor with an alternating current created via winding through the rotor and permanent magnets included by or physically coupled to the stator. Alternatively, the electric machine may not be an alternating current motor and/or generator, but may be a direct current motor and/or generator.

For the above cases of the electric machines, in addition to producing torque, the electromagnetic interactions between the windings of the stator and magnets of the rotor may produce waste heat, which can build in the material of the rotor. The magnets and windings of the in the electric machine the predominant heat generating component in the assembly. If thermal energy increases beyond a certain point, efficiency of the electric machine may decrease and/or degradation may occur to the rotor and other components of the electric machine. To prevent the waste heat from causing degradation to or affecting the function of the electric machine, a coolant and lubrication system may be used. The coolant may be passed through a plurality of passages through the rotor core to remove waste heat and mitigate temperature differences throughout the rotor. Many designs of rotors may incorporate an internal tube or a plurality of tubes, e.g., tubing, that may transport coolant to the interior of the rotor. Likewise, the internal tube or tubing may distribute coolant throughout the rotor or be in fluid communication with a plurality of holes, passages, and/or other volumes of the rotor that may distribute fluid throughout the rotor. The aforementioned holes may be distributing holes. A coolant, such as oil, may also act as lubricant for components housed by the rotor or about and supporting the rotor. For example, coolant may be distributed by holes or passages, such as the distributing holes, to lubricate shaft bearings that support the shaft.

In some examples, the use of a tube to transport coolant or other fluids may be prone to backflow and overfill. For example, if the incoming oil flow volume is more than the internal tube volume can enclose, the backflow or overflow of fluid to the rotor may occur. Backflow and/or overflow of fluid to the rotor may cause the electric machine to short. Additionally, the backflow and/or over flow may cause acute or chronic degradation to a tube or other components or features of the rotor and electric machine assembly. Removing the internal tube or tubes may prevent backflow or overflow to the rotor. For example, the rotor may be hollow, with a centrally located passage or cavity where fluid may be transported to. The cavity or the passage may distribute fluid to plurality of holes, passages, and/or other volumes of the rotor that may distribute fluid throughout the rotor. However, incoming fluid may have difficulty being directed to the plurality of holes, such as the distributing holes, from the cavity or the passage. Fluid may spread out across the inner surfaces of the cavity or passage, leading to delay in distribution or fluid remaining in the in the passage. Fluid may also splash inside the cavity or passage, leading to power losses during rotation.

The inventors herein have recognized potential issues with such systems and have developed a system for lubrication distribution comprising: a shaft comprising a scalloped shaped portion including a plurality of scalloped recesses configured to receive fluid and distribute the fluid to bearings of a traction motor, where radii of the scalloped recesses vary; and a plurality of holes positioned proximate a circumference of the scalloped shaped portion.

As one example, the architecture of cooling system in the rotor core allows equal flow of coolant across each magnetic pole of the rotor. The shaft is hollow, containing a volume, such as a central cavity or a central passage. The volume contains an inner surface. The inner surface includes the scalloped portion. The scalloped portion comprises a plurality of scallops, wherein there may be a plurality of types of scallops of different dimensions. All scallops of the scalloped portion may be positioned radially about a central axis or a centerline of the shaft and the volume. A fluid when placed in a scallop may be prevented from splashing by the curvature of the scallop. Likewise, a fluid when placed in the scallop may be directed by the curvature of the scallop when force, such as centripetal force is applied. There may be a plurality of holes, such as distribution holes, that may place the volume in fluid communication with the inner surface and scalloped section in fluid communication with outer surfaces of the shaft. Each of holes may have a first opening that is flush with the outer surface of the shaft and a second opening flush with the inner surface of the volume. Each second opening may be flush with and open to the radii of a scallop. The curvature of the scallop may catch and direct fluid toward the second opening of the hole. Additionally, the redirection of oil may be symmetrical, with all passages being radial with respect to a central axis. There may be a hole, such as a distribution hole, directing oil in a first direction for each passage that directs fluid in a second opposite direction. Each hole may be positioned radially about a rotor with respect to the axis the rotor is centered on. A central cavity may have a surface directing oil to the holes. The holes may alternate in a sequence about the centerline of the central cavity or central passage. Additional symmetry may be added by the first and second end plate, which direct the flow of coolant to an outer passage. The symmetry may increase the uniformity of the temperature of the coolant throughout the passages of the core.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
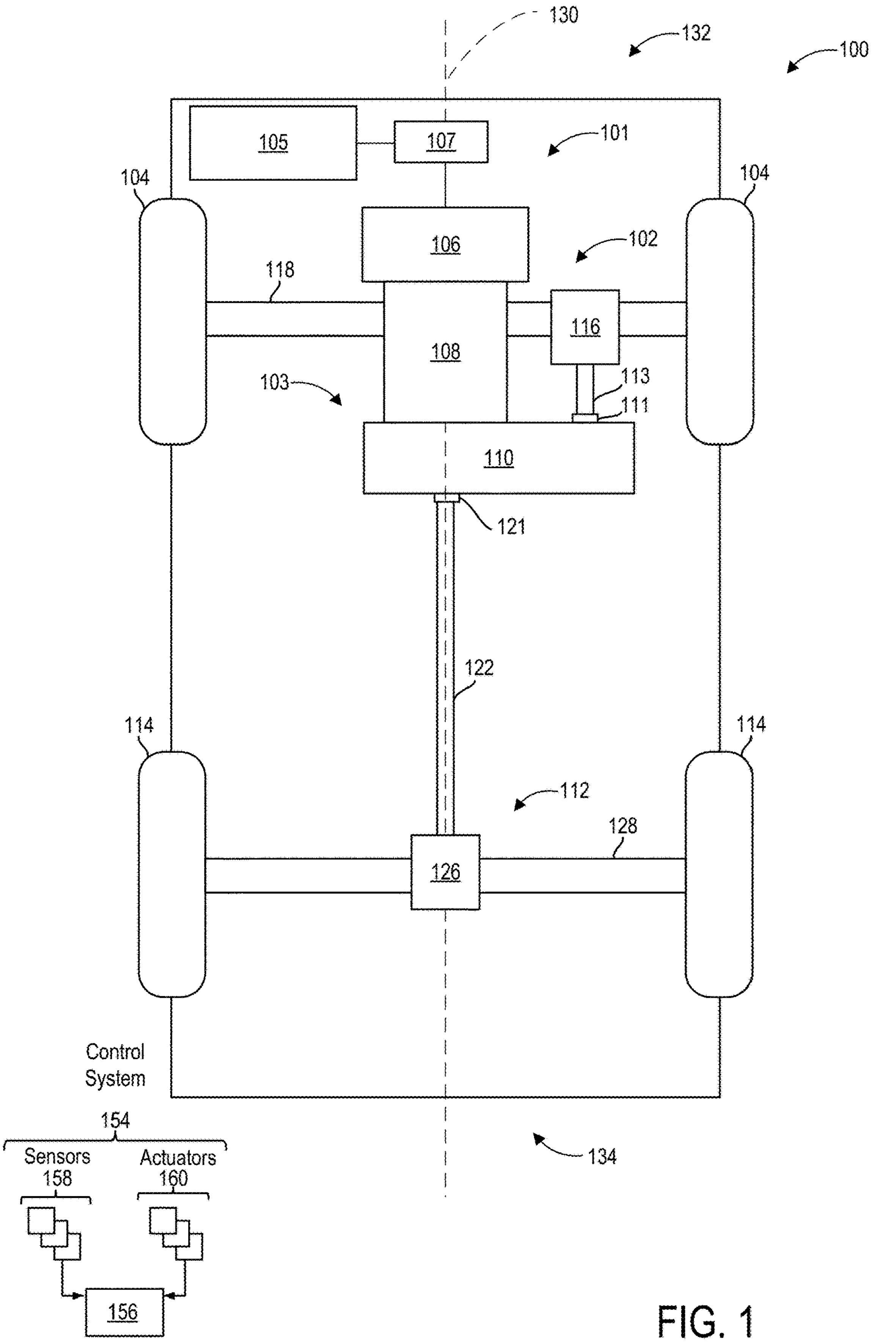
FIG. 1 shows an example schematic of a vehicle which may include an electric machine of the present disclosure.

The following description relates to a fluid distribution system for a shaft of an electric machine. The fluid is a work fluid that may be transported through the shaft and components of the electric machine. The work fluid may be a coolant and a lubricant, such as an oil. The fluid distribution system may therein be a coolant distribution system and/or lubricant distribution system, such as an oil distribution system. The electric machine may be a part of a larger assembly that includes a housing, a series of passages that may be in fluid communication with the fluid distribution system of the shaft and electric machine, and a plurality of bearings and bearing assemblies that may support and be positioned about the shaft. The housing may contain a plurality of sections, where a first section may house the electric machine. The electric machine may include the shaft, a stator, and a rotor. The rotor may be rotationally coupled to the shaft, such that as the rotor spins or rotates the shaft may spin or rotate with the rotor. The shaft may therein be a rotor shaft for the electric machine.

The shaft may be hollow and include a central volume. The central volume may be centered about a centerline of the shaft. Likewise, the central volume may be centered about axis that the shaft may be centered about. The central volume may be described as a central cavity or a central passage. The central volume may extend longitudinally with a central axis of the shaft through the shaft. The central volume may be open to the exterior of the shaft at opposite ends of the shaft, such as via a first mouth at a first end of the shaft and a second mouth at a second end of the shaft. The first end of the shaft may receive an appendage of a rotational element to rotationally couple the shaft to the rotational element. The second end of the shaft may receive work fluid from the series of passages included by the assembly separate from the shaft.

The central volume includes an inner surface. And the inner surface includes the scalloped portion. The scalloped portion may be defined as a section of the shaft that comprises at least a repeating pattern of a plurality of rounded or curved recesses in shape, such as half circular recesses. The scalloped section may include a plurality of recess types, where each recess type may have different dimensions, such as radii, from other recess types. The recesses may be referred to alternatively as scallops. All recesses may be positioned symmetrically from one another, where each recess of a recess type may be symmetrical relative to the recesses of that type. The recesses of the scalloped portion may be positioned radially about a central axis or a centerline of the shaft and the volume. The scallops may alternate in a sequence about the centerline of the central cavity or central passage.

The shaft may include a plurality of holes, such as distribution holes. The distribution holes may fluidly couple the inner surface and scalloped edges of recesses in fluid communication with outer surfaces of the shaft. Each hole may be positioned radially about a rotor with respect to the axis the rotor is centered on. The holes may alternate in a sequence about the centerline of the central volume. Each of distribution passages may have a first opening flush with the outer surface of the shaft and a second opening flush with the inner surface of the volume. Each second opening may be flush with and open to the scallop at the radius of a recess. The openings to the distribution passages may be holes. Some of the holes may direct fluid from the scalloped section and inner surface to an outer surface complementary to a bearing or a bearing assembly, where the bearing or the bearing assembly may be positioned about and support the outer surface. Fluid may be directed from the outer surface to lubricate and/or cool the bearing or the bearing assembly. Fluid may be directed from the outer surface to lubricate and/or cool the rotor of an electric machine.

When in the radius of a recess or radii of a plurality of recesses, a fluid may be prevented from splashing by the curvature of the recess or recesses. Likewise, when placed in the radius of a recess, fluid may be directed by the curvature of the recess when force, such as centripetal force is applied. The curvature of the recess may catch and direct fluid toward the second opening of the hole complementary to the recess. Additionally, the redirection of oil may be symmetrical with distribution holes positioned radially about the centerline of the shaft.

Figure 2:
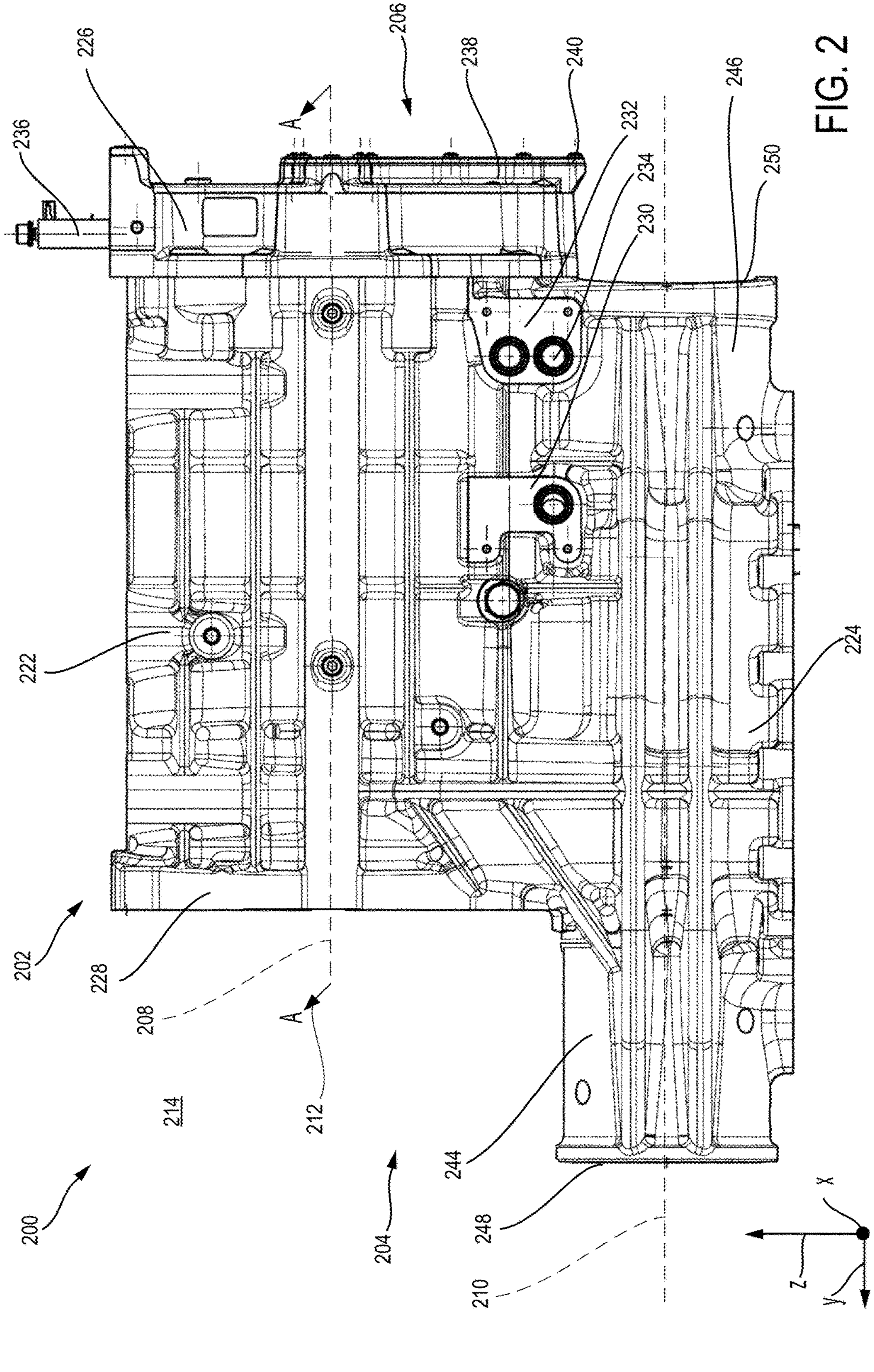
FIG. 2 shows a first view that is a side view of an assembly for an electric machine of the present disclosure.
Figure 3:
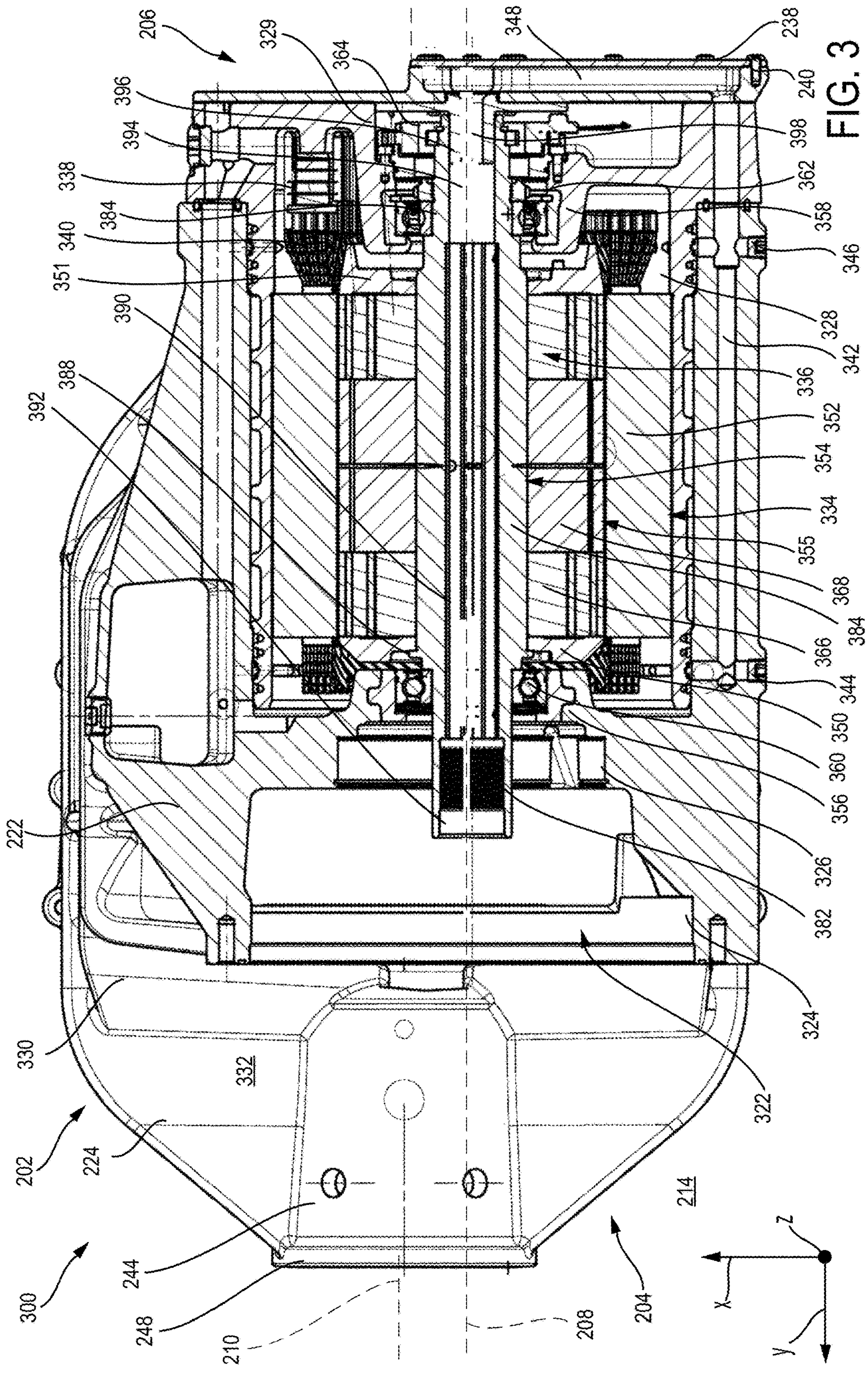
FIG. 3 shows a second view that is a sectional view of an assembly for an electric machine of the present disclosure.
Figure 4:
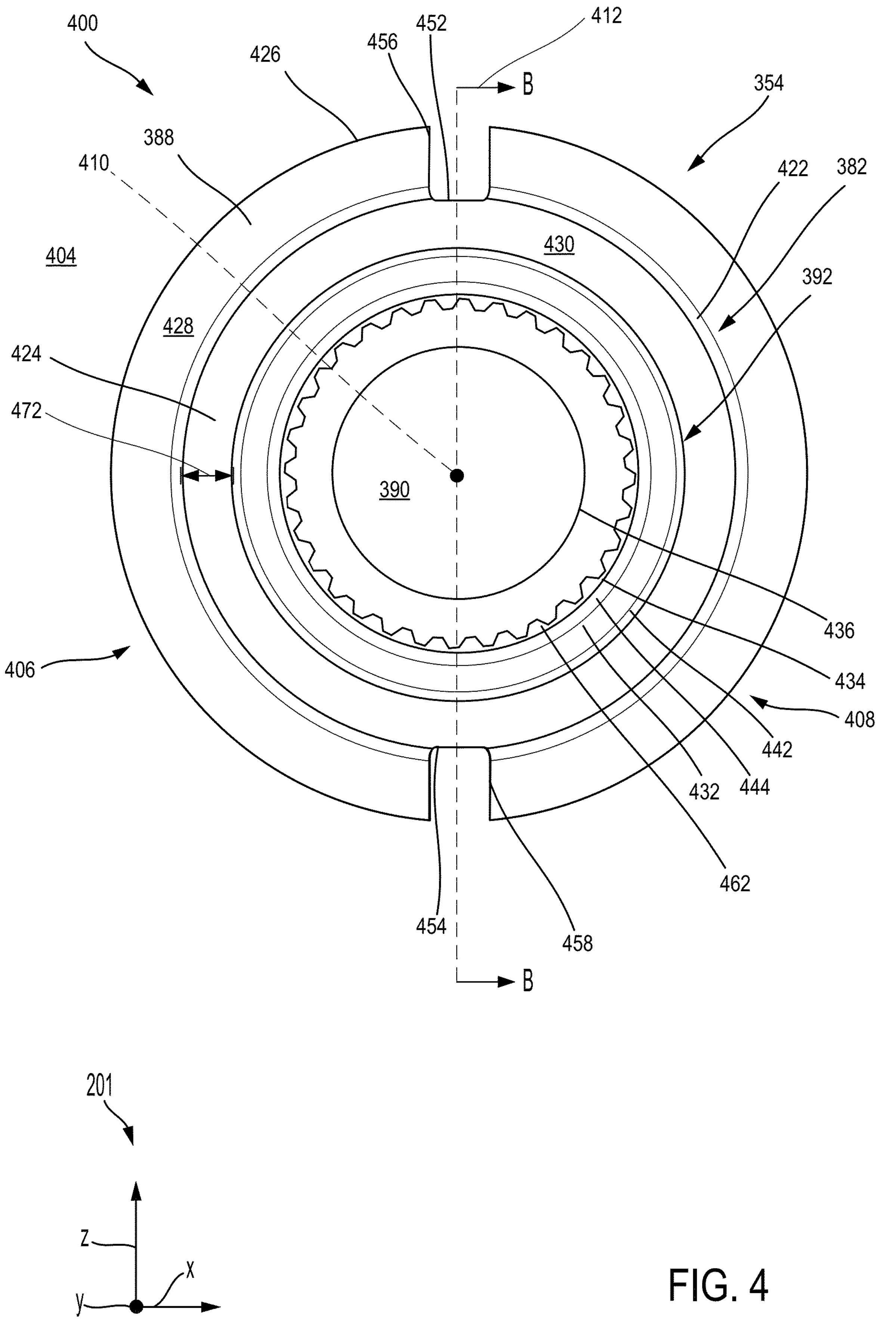
FIG. 4 shows a third view that is a side view of a shaft of the assembly.
Figure 5:
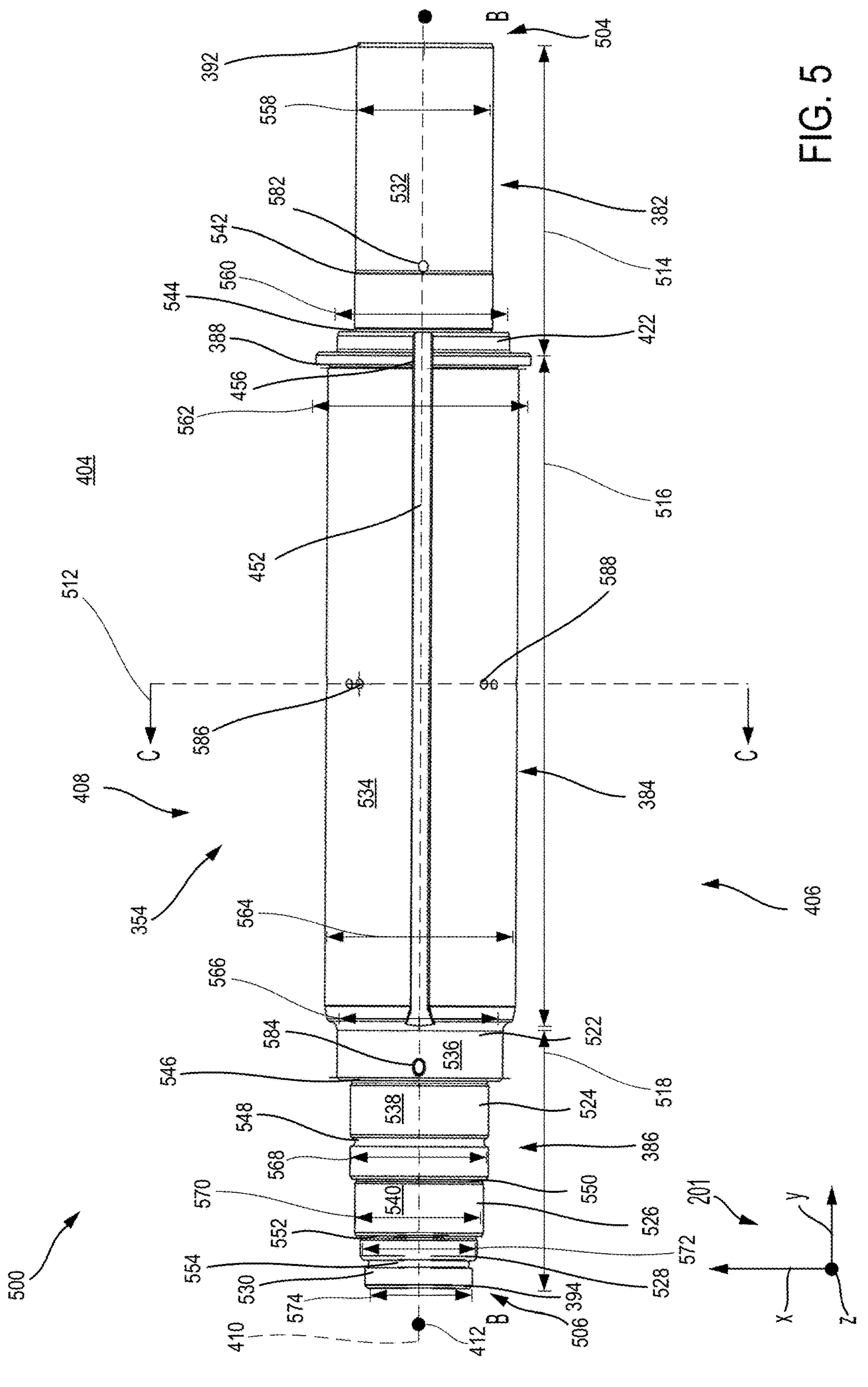
FIG. 5 shows a fourth view that is a side view of the shaft of the assembly.
Figure 6:
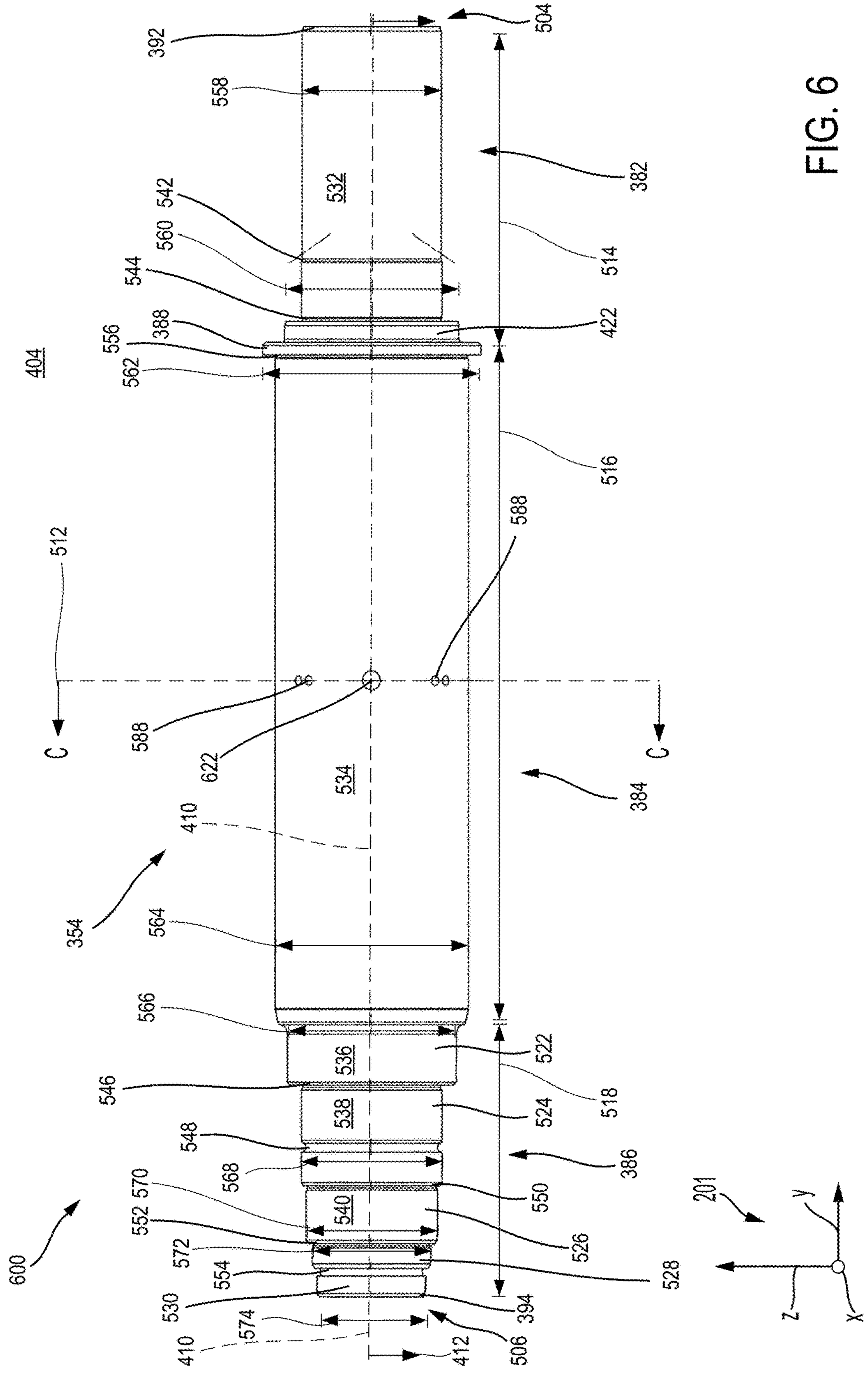
FIG. 6 shows a fifth view that is a side view of the shaft of the assembly.

FIG. 1 shows an example schematic of a vehicle which may include an electric machine of the present disclosure. FIG. 2 shows a side view of an assembly for an electric machine of the present disclosure. The assembly of FIG. 2 includes a housing comprising a plurality of sections that may house and/or receive an electric machine, a differential, and a set of axle half shafts. FIG. 3 shows a sectional view of an assembly for an electric machine of the present disclosure, including a stator, rotor, and a shaft that may be driven by the rotor. The electric machine of FIG. 3 may be the prime mover of FIG. 1. The sectional view of FIG. 3 shows components of a fluid distribution system that may fluidly couple to the shaft to transport work fluid, such as oil, to lubricate and cool the shaft and other components of the assembly. The sectional view of FIG. 3 may be taken on a line of FIG. 2. FIG. 4 shows a side view of an exemplary shaft of the present disclosure. The third view of FIG. 4 shows a passage of the shaft, as well as features to a mouth of the shaft that may receive an output. FIG. 5 shows a side view of the shaft when isolated. FIG. 6 shows a side view of the shaft when isolated. The side views of FIGS. 5-6 show features visible from the exterior of the shaft, such as a plurality of lands, grooves, outer surfaces, and distribution holes. The side view of FIG. 5 may be a vertical view and the side view of FIG. 6 may be a lateral view of the shaft.

Figure 7:
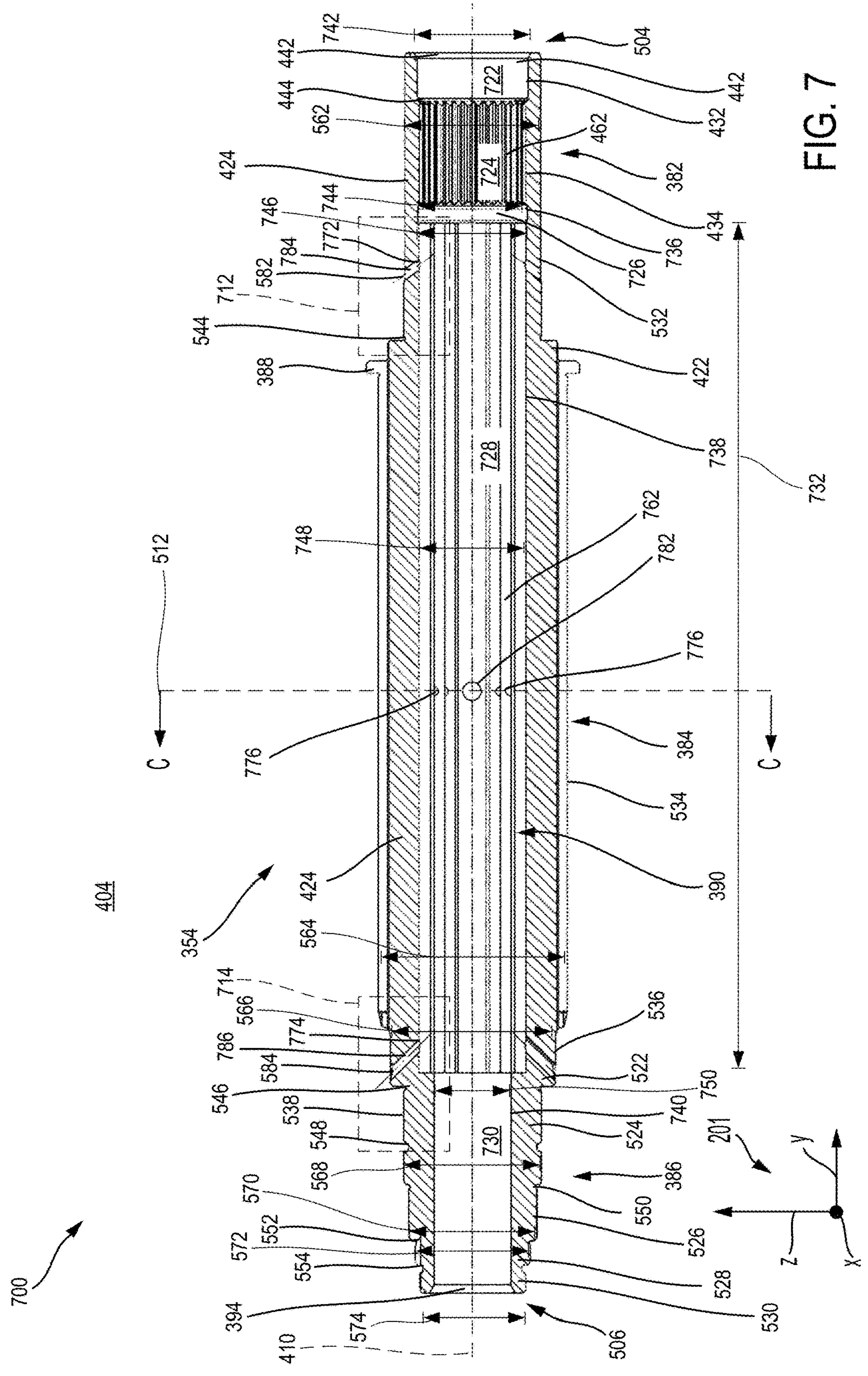
FIG. 7 shows a sixth view that is a sectional view showing the shaft of the assembly including interior features and components.
Figure 8:
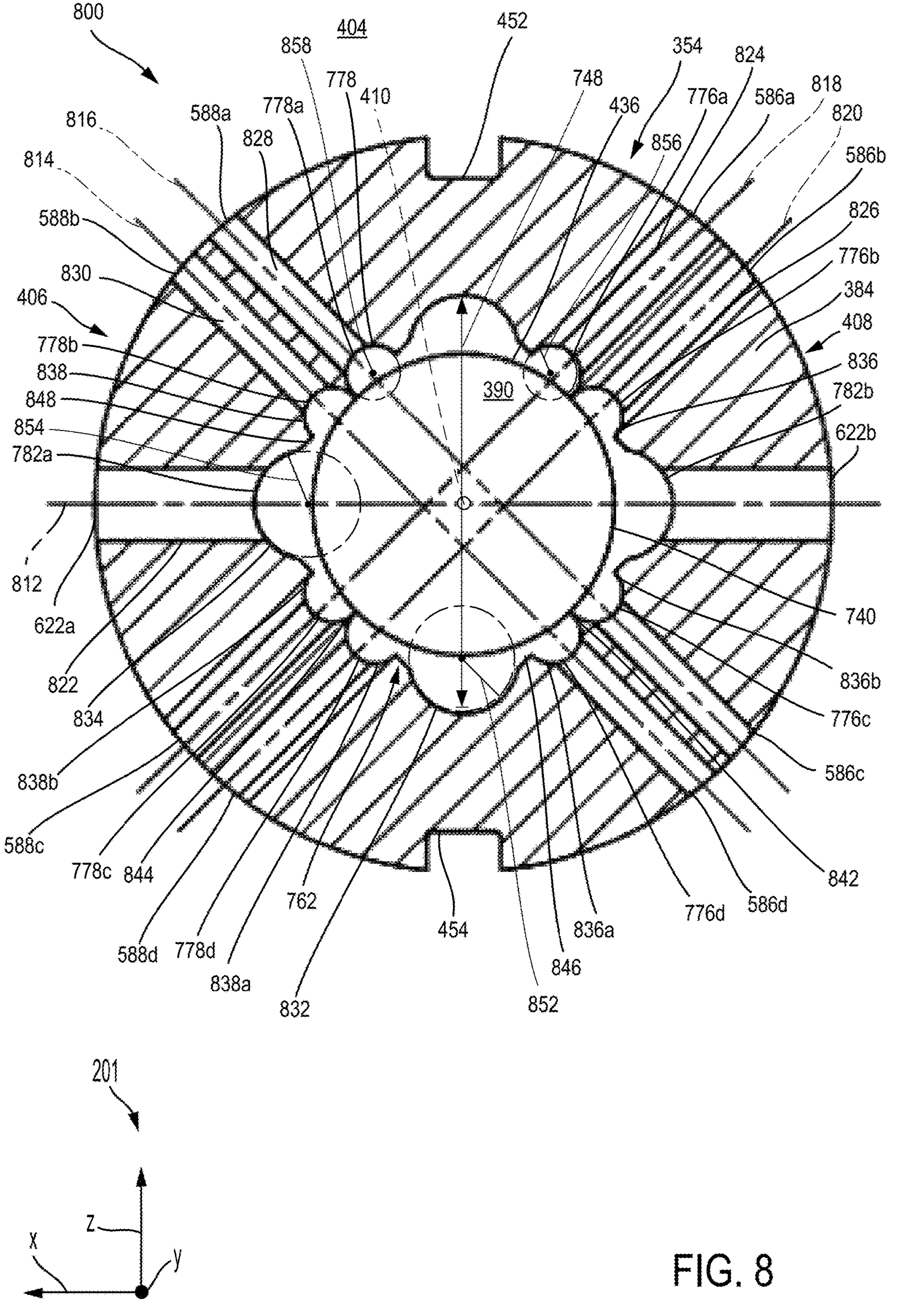
FIG. 8 shows a seventh view that is a sectional view showing the shaft of the assembly including interior components, such as a plurality of scallops and distribution passages.
Figure 9:
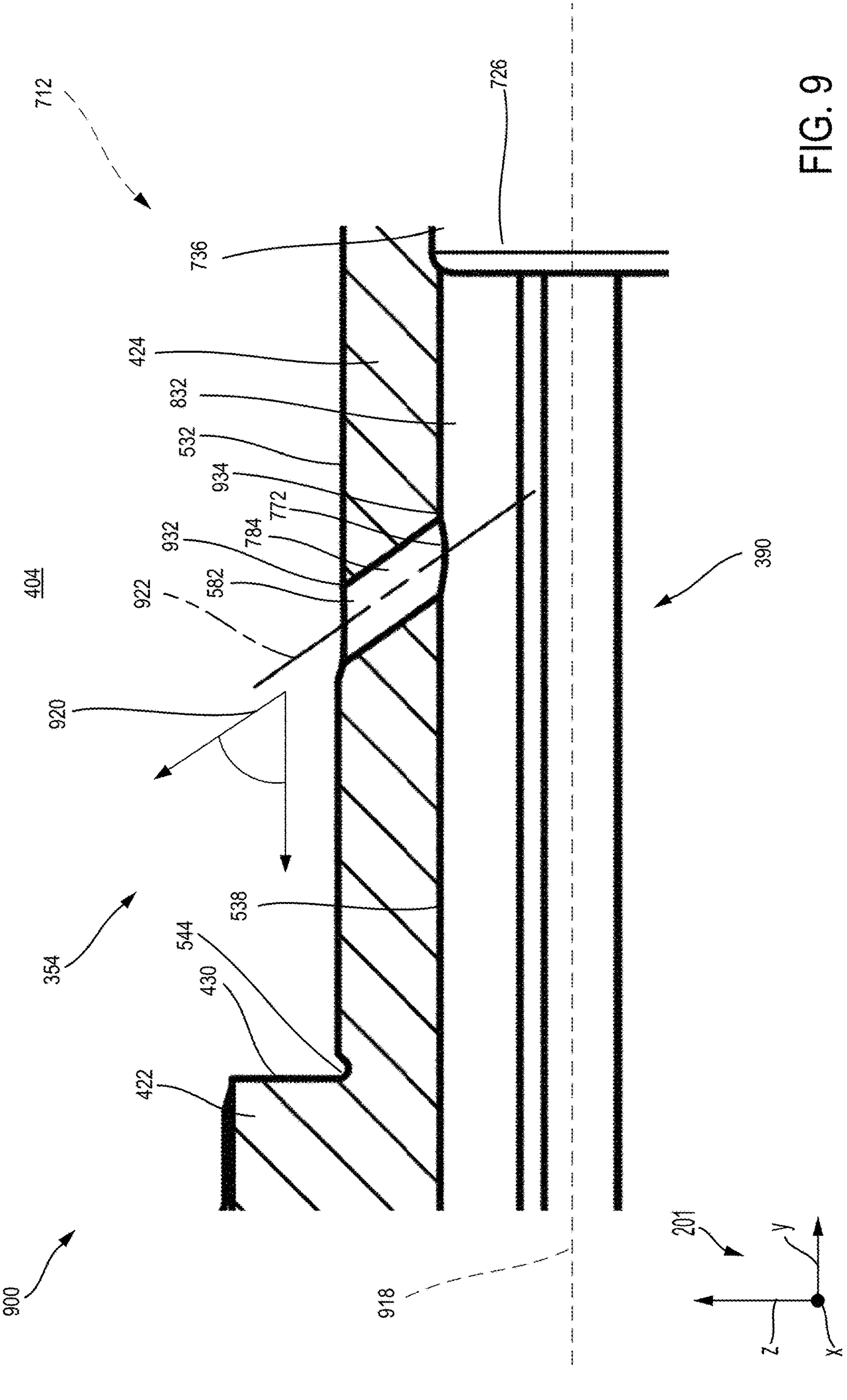
FIG. 9 shows an eighth view of a first area of the shaft containing a distribution hole and distribution passage.
Figure 10:
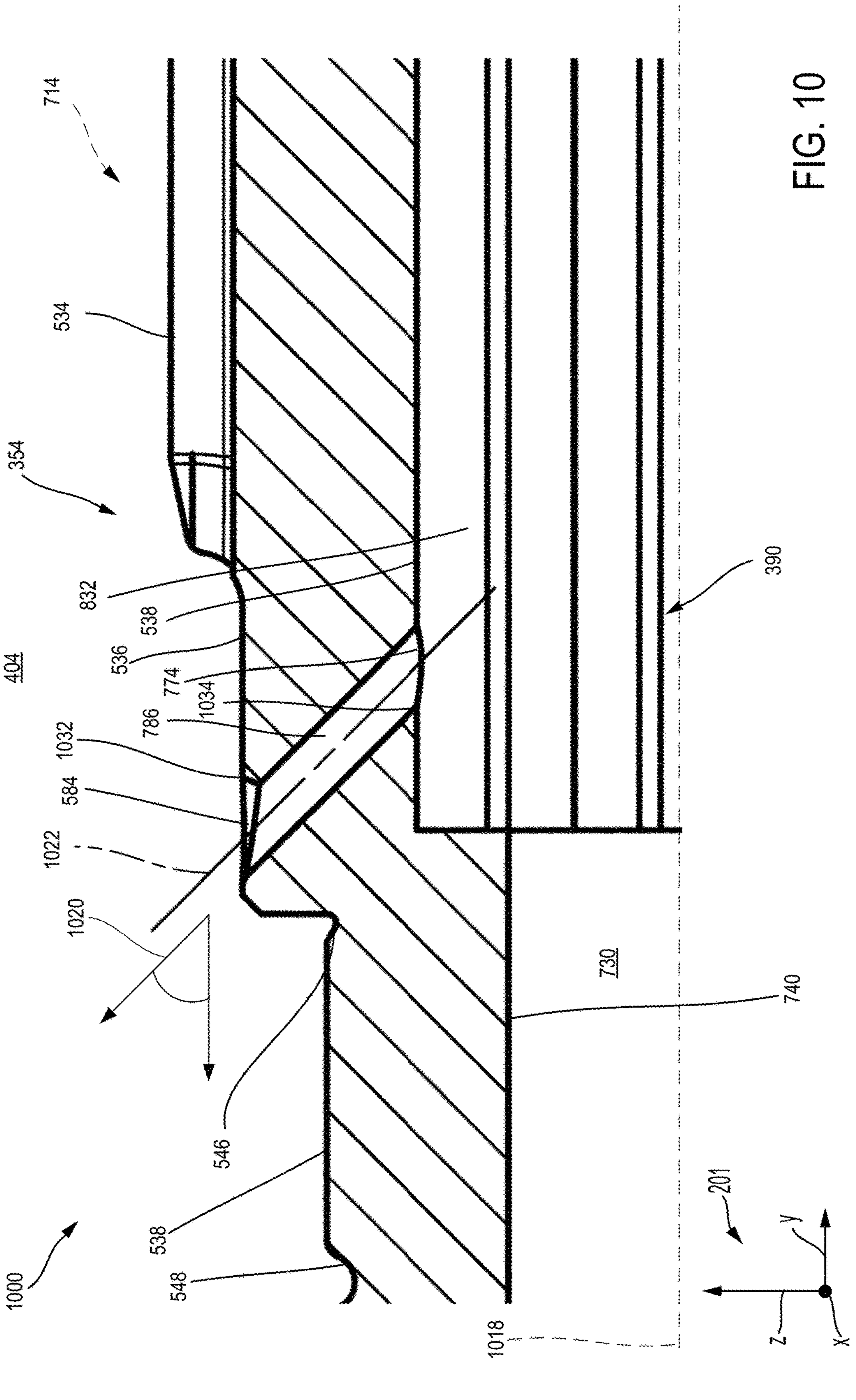
FIG. 10 shows a ninth view of a second area of the shaft containing a distribution hole and distribution passage.

FIG. 7 shows a sectional view of the shaft of FIGS. 4-6, including a plurality of sections of the inner passage that are of different diameters and the scalloped section, including the recesses and their respective dimensions, of the present disclosure for fluid distribution. FIG. 7 may is taken on a line of FIGS. 5-6. FIG. 8 shows a sectional view of the shaft, including interior components, such as a plurality of scallops. FIG. 8 shows an example embodiment of the types of scallops and distribution passages that may be included with the scalloped section. Additional FIG. 8 shows how different types of distribution holes and distribution passages may be in fluid communication with a corresponding type of scallop. Scallops that are a different type from another type of scallops may be of different dimensions. Likewise, distribution holes that are a different type of distribution hole may be in fluid communication with a different type of scallop and of different dimensions. FIG. 8 may be taken on a line of FIGS. 5-6. FIG. 9 shows an eighth view of a first area of the shaft containing a distribution hole. FIG. 10 shows a ninth view of a second area of the shaft containing a distribution hole. The first and second areas of FIGS. 9-10 may be taken on areas introduced in FIG. 7.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 shows schematics of an example configuration with relative positioning of the various components. FIGS. 2-10 show example configurations with approximate position. FIGS. 2-10 are shown approximately to scale; though other relative dimensions may be used. As used herein, the terms "approximately" is construed to mean plus or minus five percent of the range unless otherwise specified.

Further, FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. Features described as lateral may be approximately parallel with an axis that is lateral. Features described as vertical may be approximately parallel with a vertical axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and/or sport utility vehicle. Additionally or alternatively, the vehicle 100 and/or one or more of its components may be in industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to vehicle 100, as part of the rotary power transferred via the second driveshaft 122. The first differential 116 and the second differential 126 may supply a FWD and RWD, respectively, as part of an AWD mode for vehicle 100.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, speed sensors at the first and second set of wheels 104, 114, etc. Vehicle acceleration is directly proportional to accelerator pedal position, for example, degree of depression. Upon receiving the signals from the various sensors 158 of FIG. 1, controller 156 processes the received signals, and employs various actuators 160 of vehicle 100 to adjust drive train operations based on the received signals and instructions stored on the memory of controller 156. For example, controller 156 may receive an indication of depression of the brake pedal, signaling a desire for decreased vehicle speed. In response, the controller 156 may command operations, such as shifting gear modes of the transmission 108. Alternatively, the gear modes of the transmission 108 may be shifted manually, such as if the transmission 108 is a manual transmission.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine. Electric machines used in the present disclosure may traction motors, traction generators, or traction motor/generators.

In some embodiments, additionally or alternatively, the transmission 108 may be a first transmission, further comprising a second transmission arranged on the second set of axle shafts 128. Herein, the transmission 108 may be interchangeably referred to as a gearbox.

A set of reference axes 201 are provided for comparison between views shown in FIGS. 2-10. The reference axes 201 indicate a y-axis, an x-axis, and a z-axis. In one example, the z-axis may be parallel with a direction of gravity and the x-y plane may be parallel with a horizontal plane that an assembly 202 and a shaft 354 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 2, a first view 200 of an assembly 202 is shown. The assembly 202 is a motor assembly that may include a machine containing the fluid distribution system of the present disclosure. The assembly 202 may house the machine. The machine may be a mover or a generator. The machine may be an electric machine, such as an electric motor or an electric motor/generator. For an example, the electric machine housed by the assembly 202 may be prime mover 106 of FIG. 1. Additionally, the assembly 202 may house a differential, such as the first differential 116 or the second differential 126 of FIG. 1. Additionally, the assembly 202 may house a transmission, such as the transmission 108 of FIG. 1.

The assembly 202 may have a first side 204 and a second side 206, wherein the first side 204 is opposite the second side 206. The assembly may be positioned about a first axis 208 and a second axis 210. The first axis 208 may be a drive axis that an electric machine housed by the assembly 202 may be positioned about. The second axis 210 may be the axis for an axle. A plurality of axle half shafts rotationally coupled to wheels may be centered about the second axis 210. The first axis 208 and second axis 210 may be parallel. The assembly 202 may be divided by a line 212, e.g., line A-A. The line 212 is parallel with the first axis 208 and second axis 210. The line 212 is collinear with the first axis 208. A sectional view that may be taken on line 212, is shown in FIG. 3. An exterior 214 may represent a volume, such as packing space, about the assembly 202.

When in a vehicle, such as the vehicle 100, the first axis 208 and second axis 210 may be lateral with respect to the longitudinal axis of the vehicle. However, with the longitudinal axis of the assembly 202 may be referred to herein with respect to the length of the assembly 202, where the length and longitudinal axis are parallel with the axes rotational elements of the assembly are centered about. For this example, first axis 208 and second axis 210 are longitudinal with respect to the assembly 202.

The assembly 202 may include a first housing section 222 and a second housing section 224. The first housing section 222 may house the electric machine. The second housing section 224 may house a differential assembly. The second housing section 224 may also house portions of an axle assembly, such as a first half axle shaft and a second half axle shaft. The differential housed by the second housing section 224 may be a front differential or a rear differential, such as the first differential 116 or the second differential 126, respectively.

The first housing section 222 includes an end bell 226. The end bell 226 is on second side 206 of the assembly 202. The first housing section 222 may include an end structure 228. The end structure 228 may be on the first side of the assembly 202. Located longitudinally between the end bell 226 and end structure 228 may be a plurality of mounts, such as a plurality of first mount 230 and a plurality of second mount 232. The mounts of the first housing section 222, such as the first mount 230 and second mount 232, may mount the assembly 202 to components or features of a vehicle housing the assembly 202. The first and second mounts 230, 232 may each have at least a mounting hole of a plurality of mounting holes 234. For an example, the first mount 230 may have a mounting hole of the mounting holes 234. The second mount 232 may have a pair of mounting holes 234. The end bell 226 may have a first port 236. The first port 236 may be fluidly coupled and in fluid communication with a plurality of passages and volumes of the end bell 226. The end bell 226 may have a cover 238 that is removable. The cover 238 may be physically couple to end bell 226. For one example the cover 238 may be physically coupled to the end bell 226, such as via fastening via a plurality of fasteners 240. The cover 238 may fluidly seal a complementary hole included by end bell 226, such as when the cover 238 is fastened to the bell 226. When sealed by the cover 238, the complementary hole and volumes of the end bell 226 in fluid communication with the complementary hole may be fluidly sealed from the exterior 214.

The second housing section 224 may include a first sleeve 244 and a second sleeve 246. The first sleeve 244 may be on the first side 204 of the assembly 202. The second sleeve 246 may be on the second side 206 of the assembly 202. The first sleeve 244 may have a first opening 248. The second sleeve 246 may have a second opening 250. The area of the first opening 248 and the area of second opening 250 may be normal to the second axis 210. The first sleeve 244 and second sleeve 246 may be centered about the second axis 210, such that the centerlines of the first opening 248 and second opening 250 may be approximately collinear with the second axis 210. The first sleeve 244 and second sleeve 246 may be centered about the second axis 210. The first sleeve 244 and second sleeve 246 may each receive and house portions of an axle. For example, the first sleeve 244 may receive and house portions of a first axle half shaft. The second sleeve 246 may receive and house portions of a second axle half shaft. The first axle half shaft and second axle half shaft may be opposite ends of an axle shaft. The first axle half shaft and second axle half shaft may output to wheels, such as the first wheels 104 or second wheels 114 of FIG. 1, that complementary to an axle and opposite sides of the vehicle. Axle half shafts received by the first sleeve 244 or second sleeve 246 may be rotationally and drivingly couple to the differential housed by the second housing section 224. The differential housed by the second housing section 224 may output different torques and rotational speeds each axle half shaft received by the first sleeve 244 or second sleeve 246.

Turning to FIG. 3, it shows a second view 300 of the assembly 202. The second view 300 is a first sectional view of the assembly 202 taken on line 212, e.g., line A-A, of FIG. 2. The second view 300 is taken from above the assembly 202, wherein the z axis may be normal to and positive to the second view 300.

The second view 300 shows the first housing section 222 includes a plurality of volumes including a first cavity 328 and a second cavity 329. The first cavity 328 has an opening 322 on the first side 204. The opening 322 may include a first mouth 324 and a second mouth 326. The first mouth 324 may be an outer mouth that feeds to the second mouth 326. The first mouth 324 may be closest to the first side 204 from the second mouth 326. The second mouth 326 may be positioned between first mouth 324 and the first cavity 328. Surfaces of the first cavity 328 may be continuous and contiguous with surfaces of the second cavity 329. The first cavity 328 may be in fluidly communication with the second cavity 329, such as to fluidly couple. Portions of the first cavity 328 may be radially about the second cavity 329. The second cavity 329 may be separated from the first cavity 328 via material of the first housing section 222, where the material of the first housing section 222 is positioned about and defines the volume of the second cavity 329. The material of first housing section 222 may form a first collar 356 and a second collar 358. The interior surfaces of the second collar 358 may define the volume of the second cavity 329.

The second view 300 shows the second housing section 224 includes a shell 330 and a web 332. The shell 330 may house a differential and portions of components and features that may be rotationally coupled to the differential. The web 332 may be a material of the second housing section 224 that extends outward, such as a platform, that may mechanically support features of the second housing section 224. The web 332 may extend about and from features of the second housing section 224, such as the first sleeve 244 and the shell 330. The web 332 may be level with a plane, and the aforementioned plane may be parallel with a plane formed by the x-axis and y-axis of the reference axes 201.

Returning to the first housing section 222, the first cavity 328 and the second cavity 329 may house an electric machine assembly 334. Different components of the electric machine assembly 334 may be housed in the first cavity 328 and the second cavity 329. However, some components, such as the shaft 354, may be housed by both the first cavity 328 and the second cavity 329. The first cavity 328 may house an electrical assembly 338. The electrical assembly 338 may be housed at an end of the first cavity 328, nearest to the second side 206. The electrical assembly 338 may be positioned about the second cavity 329, and the electrical assembly 338 may be separated from the second cavity 329 and supported via the material of the first housing section 222.

The electric machine assembly 334 may be an electric machine system, such as a motor and/or generator system, such as a traction motor system and/or a traction generator system. The electric machine assembly 334 may include an electric machine as well as a plurality of supporting and auxiliary components, such as bearings. The electric machine of the electric machine assembly 334 may be the mover or generator for the motor assembly 202. The electric machine of the electric machine assembly 334 may be a traction motor or a traction motor/generator. The electric machine assembly 334 may include a third cavity 336. The third cavity 336 may be positioned about the axis 208. The third cavity 336 may be centered about the axis 208, such as be positioned radially about the axis 208. Likewise, the electric machine assembly 334 may be positioned about the axis 208. The electric machine assembly 334 may be positioned to be approximately centered about the axis 208, such as to be positioned radially about the axis 208. For an example, the electric machine assembly 334 may be positioned radially about the axis 208 when the third cavity 336 is positioned approximately radially about the axis 208. The third cavity 336 may be a passage or a hole that extends from an end to an opposite end of the electric machine assembly 334. The third cavity 336 may be a through passage or a through hole extending through the electric machine assembly 334. The third cavity 336 may have a volume and have a surfaced that is approximately cylindrical in shape. The electrical assembly 338 may supply the electric machine assembly 334 with electrical energy. The electrical assembly 338 may electrically couple to the electric machine assembly 334 via a plurality of electrical windings. For an example, the windings may be wiring 340. The wiring 340 may extend through the components and features of electric machine assembly 334. The wiring 340 may be grounded at the opposite side of the first cavity 328 from the electrical assembly 338. The electric machine assembly 334 may convert the electrical energy supplied by the electrical assembly 338 to rotational energy, and transmit rotational energy via torque. As an example, an alternating current of electrical energy through the wiring 340 may convert the electrical energy to rotational energy via forcing the rotational elements of the electric machine assembly 334 to spin or rotate about the axis 208. The electrical assembly 338 may be electrically coupled to and draw electrical energy from an energy source, such as energy storage device 105 of FIG. 1.

The first cavity 328, second cavity 329, and the electric machine assembly 334 may be supplied with work fluid via a plurality of fluid passages. The work fluid may be a coolant and/or lubricant, such as oil. The fluid passages may alternatively be referred to as oil passages, such as when transporting oil. For example, the first housing section 222 may have a first passage 342. The first passage may be fluidly coupled and in fluid communication with a first port 344, a second port 346 and a second passage 348. The first port 344 and second port 346 may also be in fluid communication with and fluidly coupled to the first cavity 328. The cover 238 may include the second passage 348. The centerlines of first port 344 and second port 346 may extend in a direction perpendicular to centerline of the first passage 342. The centerlines of the first port 344 and second port 346 may extend in a direction radial with respect to the first cavity 328 and the first axis 208. Work fluid may be supplied to the first passage 342 via the first port 344 and second port 346. The first port 344 and second port 346 may fluidly couple to a source of work fluid in the exterior 214. When fluidly coupled, fluid may be driven from the first passage 342 to the second passage 348. Fluid in the second passage 348 may be supplied to the electric machine assembly 334. Work fluid from the second passage 348 may lubricate components of the electric machine assembly 334. Work fluid from the second passage 348 may mitigate changes in thermal energy to and remove buildup of thermal energy from components of the electric machine assembly 334, such as when acting as a coolant.

The electric machine assembly 334 may comprise a stator 352, a rotor 355, and the shaft 354, where the stator 352, the rotor 355, and the shaft 354 may be positioned radially about the axis 208. The stator 352 may be positioned about the rotor 355, the shaft 354, and the axis 208. The stator 352 may be positioned about the rotor 355, the shaft 354, and the axis 208, such that the inner surface of the stator 352 is positioned approximately radially about the rotor 355 and the shaft 354. The rotor 355 may be positioned about the shaft 354 and the axis 208. The shaft 354 may be positioned about the axis 208, such as radially about axis 208. Likewise, the rotor 355 may be positioned radially about the axis 208. The shaft 354 and rotor 355 may not be in surface sharing contact with the stator 352. The rotor 355 and stator 352 may be separated by a clearance. The stator 352 may include the third cavity 336, where the third cavity 336 may be defined by an inner surface of the stator 352. The surface of the third cavity 336 may be approximately cylindrical in shape. Likewise, the stator 352 may be approximately cylindrical in shape. The shaft 354 may be housed by and extend through the third cavity 336. The rotor 355 may be housed by the third cavity 336. The shaft 354 may be a rotor shaft, and therein support and be in surface sharing contact with the rotor 355. The rotor 355 may be physically and rotationally coupled to the shaft 354, such that the shaft 354 may rotate in the same direction as the rotor 355. When rotated, the shaft 354 may spin about the axis 208, such as when the shaft 354 is centered about the axis 208.

The electric machine assembly 334 may also include a first plate 350 and a second plate 351. The first plate 350 may be positioned about the shaft 354 and the axis 208. Additionally, the first plate 350 may be positioned between the stator 352 and the opening 322. The second plate 351 may be positioned about the shaft 354 and the axis 208. Additionally, the first plate 350 may be positioned between the stator 352 and the second cavity 329. The second plate 351 may be positioned between the stator 352 and the second mouth 326. Likewise, the shaft 354 may support and be in surface sharing contact with the first plate 350 and second plate 351. The first plate 350 and the second plate 351 may each be physically and rotationally coupled to the shaft 354, such that the first plate 350 and/or second plate 351 may rotate in the same direction as the shaft 354. The first and second plates 350, 351, may be baffles that may prevent power losses from splashing of work fluid in the third cavity.

The first collar 356 and the second collar 358 may be positioned about and support portions of the shaft 354. The first plate 350 may be positioned between the first collar 356 and the stator 352, such as when the first plate 350 is positioned about and/or rotationally coupled to the shaft 354. The second plate 351 may be positioned between the second collar 358 and the stator 352, such as when the second plate 351 is positioned about and/or rotationally coupled to the shaft 354. The first collar 356 and second collar 358 may be centered about the axis 208, such that the first collar 356 and second collar 358 are positioned radially about the axis 208. When the first collar and second collar 358 are positioned radially about the axis 208, the axis 208 may be normal to areas of each opening to the first collar 356 and second collar 358. Likewise, the axis 208 may approximately intersect with the center points of the openings to the first collar 356 and second collar 358. The shaft 354 may extend through the first collar 356 to the opening 322. The shaft 354 may extend through the second collar 358 to the second cavity 329.

The first collar 356 may support and house a first bearing 360. Likewise, the second collar 358 may support and house a second bearing 362. The first bearing 360 may be positioned about the shaft 354, and may be positioned between an inner surface of the first collar 356 and the shaft 354 when about the shaft 354. The second bearing 362 may be positioned about the shaft 354, and may be positioned between an inner surface of the second collar 358 and the shaft 354 when about the shaft 354. The first bearing 360 may be positioned radially about the shaft 354, and the first bearing 360 may be placed radially between the first collar 356 and the shaft 354. The second bearing 362 may be positioned radially about the shaft 354, and the second bearing 362 may be placed radially between the second collar 358 and the shaft 354. A third bearing 364 may also be positioned about the shaft 354, such as radially about the shaft 354. The third bearing 364 may be housed and supported by the second cavity 329. The third bearing 364 may be positioned between the shaft 354 and an inner surface of the second cavity 329. Additionally or alternatively, the third bearing 364 may be positioned between the shaft 354 and other components housed by the second cavity 329, wherein the other component are positioned about the shaft 354.

The stator 352 may include a plurality of first stacks 366. The rotor 355 may include a plurality of second stacks 368. The first stacks 366 may be sections, such as laminations, that may comprise the stator 352. The second stacks 368 may be sections, such as laminations, that comprise the rotor 355. The first stacks 366 may house and support structures and components that extend through or are housed by the stator 352. For example, the first stacks 366 may house the windings, such as wiring 340. The second stacks 368 may house and support structures and components that extend through or are housed by the rotor 355. For example, the second stacks 368 may house magnetic components, such as permanent magnets.

The shaft 354 may include a first section 382, a second section 384, and a third section 386. The first section 382 may extend through the first collar 356. The first collar 356 may be positioned about the first section 382, such as radially about the first section 382. The stator 352 and the third cavity 336 may be positioned about the second section 384, such as radially about the second section 384. The third section 386 may extend through the second collar 358. The second collar 358 may be positioned about the third section 386, such as radially about the third section 386. The first section 382 may be centered through the first collar 356, such that the centerline of the first section 382 and the centerline of the first collar 356 may be collinear. The first section 382 may extend through the first collar 356. The first collar 356 may be positioned about the first section 382, such as radially about the first section 382. The first section 382 may be centered through the first collar 356, such that the centerline of the first section 382 and the centerline of the first collar 356 may be collinear. The first bearing 360 may support the first section 382. Likewise, the second and third bearings 362, 364 may support the third section 386. The first bearing 360 may be positioned about the first section 382, and the first bearing 360 may be positioned between an inner surface of the first collar 356 and the first section 382. The first bearing 360 may be positioned radially about the first section 382, and the first bearing 360 may be placed radially between the first collar 356 and the first section 382. The second bearing 362 may be positioned about the shaft 354, and the second bearing 362 may be positioned between an inner surface of the second collar 358 and the third section 386. The second bearing 362 may be positioned radially about the third section 386, and the second bearing 362 may be placed radially between the second collar 358 and the third section 386. The third bearing 364 may be positioned about the third section 386. The third bearing 364 may be positioned radially about the third section 386. The third bearing 364 may be positioned between third section 386 and other components housed by the second cavity 329, wherein the other components are positioned about the third section 386. The rotor 355 may be positioned about the second section 384. The second section 384 may support rotor 355, such as when rotationally coupled to the shaft 354.

A shoulder 388 may extend in an outward direction from second section 384, with respect to the axis 208 and outer surface of the second section 384. The shoulder 388 may extend radially away from and about the second section 384. The first plate 350 may be positioned about the shoulder 388. The first plate 350 may abut the shoulder 388, such as when positioned about the shoulder 388. The shoulder 388 may prevent the first plate 350 from moving/sliding longitudinally toward the first side 204, with respect to the axis 208. The first plate 350 may be positioned radially about the shoulder 388. The first plate 350 may be fit to the shoulder 388, such that the shoulder may fit to an inset to the first plate 350. When fit to the first plate 350, the shoulder 388 may physically and rotationally couple the first plate 350 to the shaft 354.

The shaft 354 may be a hollow shaft, where the shaft 354 includes at least a hollow portion that is a volume. For example, of an embodiment, the shaft 354 may be a sleeve, where the sleeve is about the hollow portion. The volume may be a continuous volume, such as a through passage or a through hole that extends from the first section 382 to the third section 386. The volume has an opening on the first section 382 and an opening on the third section 386. For this example, the volume may be a third passage 390. The third passage 390 is a through passage through the shaft 354. The third passage 390 has a first opening 392 at an end of the first section 382 and a second opening 394 at an end of the third section 386. The first opening 392 may include a plurality of splines. The splines of the first opening 392 may be complementary to an output of the assembly 202, such as another shaft or another rotational element. When the splines of the first opening 392 mesh with the complementary splines of the output, the output may be rotationally coupled to the shaft 354. Torque from the shaft 354 may be transferred to and drive the output, such as when the output is rotationally coupled via the splines. The second opening 394 may be complementary to an insert 396. The insert 396 may be a hollow structure including a continuous volume, such as a through passage or a through hole that extends through the insert 396. The insert 396 may be received by the second opening 394 such as to be physically coupled to the shaft 354 and fluidly coupled to the third passage 390. Fluid may be transported from a first end to a second end opposite the first end of the insert 396 via the volume. For example, the insert 396 may include a fourth passage 398. The fourth passage 398 may be a through passage, such as a through hole. The fourth passage 398 may place the third passage 390 in fluid communication with the second passage 348, such as when the insert 396 is received by the second opening 394. Fluid may flow through the insert 396 from the second passage 348 via the fourth passage 398. Fluid may flow to the third passage 390 from the insert 396 via the fourth passage 398.

Work fluid received by the shaft 354, such as from the second opening 394, may be spread outward toward the components about the shaft 354, such as the rotor 355, the first bearing 360, and second bearing 362. Work fluid may be driven in an outward direction via a plurality of distributing holes from the shaft 354. For example, the third passage 390 may be fluidly coupled to and in fluid communication with a plurality of distribution holes of the shaft 354. The distribution holes may extend from the third passage 390, through the material of the shaft 354, and to outer surfaces of the shaft 354. The outward force from the rotation or spin of the shaft 354 may drive fluid out through the distribution holes. The openings to the distribution holes at the outer surface of the shaft 354 may distribute lubricant to the outer surfaces and components about the outer surfaces. The outward force from the rotation or spin of the shaft 354 may drive fluid outward from the outer surfaces to components or features positioned about the shaft 354. For example, a plurality of second distribution holes may distribute fluid from the third passage 390 to the first section 382, and the first section 382 may distribute and apply fluid to the first bearing 360. For this or another example, a plurality of second distribution holes may distribute fluid from the third passage 390 to the outer surface of the second section 384, and from the outer surface of the second section 384 may distribute fluid to the third cavity 336. The second distribution holes and outer surface of the second section 384 may deliver fluid to lubricate and cool the rotor 355. The second distribution holes may be contiguous with a surface or a plurality of surfaces of the second section 384. For this or another example, a plurality of third distribution holes may distribute fluid from the third passage 390 to the outer surface of the third section 386, and the outer surface of the third section 386 may distribute fluid to the second and third bearings 362, 364. Fluid in these examples may be coolant and/or lubricant.

Turning to FIG. 4, it shows a third view 400 of the shaft 354. The third view 400 shows the shaft 354 isolated from other components and features of the assembly 202 of FIGS. 2-3. The third view 400 is also a second side view. The third view 400 is taken from a view normal to the longitudinal axis of the assembly 202, wherein the y axis of the reference axes 201 may be normal to and positive to the second view 300. Outer surfaces of the shaft 354 may be open to an exterior 404. The exterior 404 may be a volume, such as a packaging space, located about the shaft 354. The outer surfaces of the shaft 354 may be open to the exterior 404. The shaft 354 and third passage 390 may be centered about a first axis 410. The first axis 410 may be a longitudinal axis parallel with the y axis of the reference axes 201 and the first axis 208 of FIGS. 2-3. The axis 410 may be the first axis 208. The third view 400 shows the shaft 354 from a first end located on the first section 382. The shaft 354 may be divided by a second line 412, e.g., line B-B. The second line 412 may be perpendicular to the axis 410. The second line 412 may divide the shaft 354 into two approximately symmetrical halves. The second line 412 may be vertical relative to the positioning of the shaft 354, and the second line 412 may be parallel with the z axis of the reference axes 201. A sectional view may be taken on the second line 412. The second line 412 may divide the shaft into a first side 406 and a second side 408. The first side 406 may be opposite to the second side 408 with respect to the second line 412.

The first section 382 includes a wall 424. The wall 424 may include a first land 422 where. The first land 422 and the wall 424 may each be cylindrical in shape. The wall 424 may be tubular in shape. The first land 422 may extend radially from a section the wall 424 positioned about and extending longitudinally from the first opening 392. The wall 424 may be positioned radially about the third passage 390. The shoulder 388 and the first section 382 may include a first surface 428 and a second surface 430, respectively. The first surface 428 and second surface 430 may be surfaces normal to the axis 410, the centerline of the shaft 354 and the third passage 390, the y axis of the reference axes 201, and the longitudinal direction. The first surface 428 and second surface 430 may be positioned to be coplanar with planes parallel with a plane formed by the x and z axes of the reference axes 201. The first surface 428 may be circular in shape, such as to be a ring shaped surface about the first section. The first surface 428 may extend in a radial direction from and about the first land 422. The first surface 428 extend in a radial direction from and about the first section 382. The first surface 428 may terminate at a perimeter 426 of the shoulder 388. The second surface 430 may be circular in shape, such as to be a ring shaped surface about the first opening 392. The second surface 430 may extend in a radial direction from and about the first opening 392.

The first section 382 may also include a first inner surface 432 and a second inner surface 434. The first inner surface 432 and second inner surface 434 are surfaces that may be positioned about and form the volumetric shape of the third passage 390. Likewise, the third view 400 shows a third inner surface 436. The third inner surface 436 may be positioned about and form the volumetric shape of the third passage 390. The third inner surface 436 may be part of the third section 386, and therein positioned about a section of the third passage 390 concentric to the third section 386. The sections of the third passage 390 concentric to the first inner surface 432, the second inner surface 434, and third inner surface 436 may be of different diameters. The first inner surface 432, second inner surface 434, and third inner surface 436 may be cylindrical in shape. The first inner surface 432, second inner surface 434, and third inner surface 436 may be positioned radially about the axis 410.

The first section 382 may include a first countersink 442 and a second countersink 444. The first opening 392 may include the first countersink 442. The first countersink 442 may be positioned longitudinally between the second surface 430 and the first inner surface 432. Likewise, the second countersink 444 may be positioned longitudinally between and continuous with the first inner surface 432 and the second inner surface 434. The first countersink 442 and second countersink 444 may be positioned about the third passage 390. The first countersink 442 and second countersink 444 may be positioned radially about the third passage 390. The first countersink 442 may join the second surface 430 to the first inner surface 432, such that the second surface 430 is contiguous with the first inner surface 432. The second countersink 444 may join the first inner surface 432 to the second inner surface 434, such that the first inner surface 432 is continuous with the second inner surface 434. The wall 424 may have a thickness 472. The thickness 472 may extend radially outward from the first countersink 442. The thickness 472 may vary at different positions on the longitudinal axis. For example, the thickness 472 may vary with different sections of the shaft 354, such as with the first section 382, second section 384, and third section 386 of FIG. 3. Additionally, the thickness 472 may increase or decrease with features of the shaft 354, such as at different lands of the shaft 354, such as the first land 422.

There may be a plurality of grooves positioned about and depressed into the material of the shaft 354. The shaft 354 may include a first groove 452 and a second groove 454. The first groove 452 and a second groove 454 may depress from a perimeter of the first land 422 and through a portion of the material of the wall 424 in a radial direction toward the passage 390. The first groove 452 and a second groove 454 may depress from the perimeter of the wall 424 and through a portion of the material of the wall 424 in a radial direction toward the passage 390. The first groove 452 may be continuous with a first notch 456. The second groove 454 may be continuous with a second notch 458. The first notch 456 and second notch 458 may depress in a radial direction from the perimeter 426, through the material of the shoulder 388, and merge with the first groove 452 and second groove 454, respectively. The first groove 452 and second groove 454 may be positioned approximately symmetrically from one another about the shaft 354. The first notch 456 and second notch 458 may be positioned approximately symmetrically from one another about the shaft 354.

Turning to FIG. 5, it shows a fourth view 500 of the shaft 354. The fourth view 500 shows as side view of shaft 354 isolated from other components and features of the assembly 202 of FIGS. 2-3. The fourth view 500 is taken from a view normal to a vertical axis of shaft 354, with respect to the reference axes 201. The shaft 354 may have a first end 504 and a second end 506 that are opposite to one another. The first section 382 may be nearest to the first end 504, wherein the first opening 392 may be formed on the first end 504. The third section 386 may be nearest to the second end 506, wherein the second opening 394 may be formed on the second end 506.

The fourth view 500 may be divided by a third line 512, e.g., a line 512. The line 512 may be positioned at the center of the shaft 354, such as at the center of the second section 384. The first section 382 may be a first length 514. The second section 384 may be a second length 516. The third section 386 may be a third length 518. The first length 514, second length 516, and third length 518 are longitudinal relative to the shaft 354 and may be parallel with the axis 410.

The shaft comprises a plurality of sections having different dimensions. Each section is substantially cylindrical and includes a surface which curves and is positioned approximately radially about the axis 410. The first section 382 may include a first outer surface 532 extending longitudinally between the first land 422 and the first opening 392. The first outer surface 532 may be a perimeter, such as a circumference, of the first section 382. The first outer surface 532 may curve about the axis 410, and may curve and be positioned approximately radially about the axis 410. The first outer surface 532 may be cylindrical in shape. Likewise, the second section 384 may include a second outer surface 534 extending longitudinally between the third section 386 and the shoulder 388. The second outer surface 534 may be a perimeter, such as a circumference, of the second section 384. The second outer surface 534 may curve about the axis 410, and may curve and be positioned approximately radially about the axis 410. The second outer surface 534 surface may be cylindrical in shape. The first groove 452 may extend the second length 516 and through the second outer surface 534 of the second section 384. The first groove 452 may depress in a direction radially toward the axis 410 and through the second outer surface 534. Likewise, the second groove 454 of FIG. 4, may mirror the first groove 452 on the opposite side of the axis 410 from the first groove 452.

The third section 386 may include a plurality of lands of different diameters, such as a second land 522, a third land 524, a fourth land 526, a fifth land 528, and a sixth land 530. The second land 522 may include the first outer surface 532. The sixth land 530 may be located radially about the second opening 394, with respect to the axis 410. In order from furthest to closest from the second end 506, the lands of the third section 386 are the second land 522, the third land 524, the fourth land 526, the fifth land 528, and the sixth land 530.

The second land 522 includes a third outer surface 536. The third outer surface 536 may be a perimeter, such as a circumference, of the second land 522. The third land 524 includes a fourth outer surface 538. The fourth outer surface 538 may be a perimeter, such as a circumference, of the third land 524. The fourth land 526 includes a fifth outer surface 540. The fifth outer surface 540 may be a perimeter, such as a circumference, of the fourth land 526. The fifth land 528 includes a sixth outer surface. The sixth outer surface may be a perimeter, such as a circumference, of the fifth land 528. The sixth land 530 includes a seventh outer surface. The seventh outer surface may be a perimeter, such as a circumference, of the sixth land 530. The third outer surface 536, fourth outer surface 538, fifth outer surface 540, sixth outer surface, and seventh outer surface may curve about the axis 410, and the aforementioned outer surfaces may curve and be positioned approximately radially about the axis 410. The third outer surface 536, the fourth outer surface 538, the fifth outer surface 540, the sixth outer surface, and the seventh outer surface may be cylindrical in shape.

The aforementioned lands and their outer surfaces of the first section 382, the second section 384, and the third section 386 may have a plurality grooves. Each groove may be located about and depress into the outer surface of the respective section. For example, the first section 382 may include a third groove 542 and a fourth groove 544. Additionally, the second section 384 may include a tenth groove

556. Likewise, the third section 386 may include a fifth groove 546, sixth groove 548, seventh groove 550, an eighth groove 552, and a ninth groove 554.

The first outer surface 532 may include the third groove 542, where the third groove 542 may be located about and depress into the first outer surface 532. The third groove 542 may curve with the curvature of the first outer surface 532, such that the third groove 542 may curve radially about and depress in a radial direction toward the axis 410. The fourth groove 544 may be positioned longitudinally between the first land 422 and the first outer surface 532. The fourth groove 544 may be located about and depress into the first section 382. The fourth groove 544 may curve with the curvature of the first section 382, such that the fourth groove 544 may curve radially about and depress in a radial direction toward the axis 410.

The tenth groove 556 may be positioned longitudinally between the shoulder 388 and the second outer surface 534. The tenth groove 556 may be located about and depress into the second section 384. The tenth groove 556 may curve with the curvature of the second section 384 and the second outer surface 534, such that the tenth groove 556 may curve radially about and depress in a radial direction toward the axis 410.

The fifth groove 546 may be positioned longitudinally between the second land 522 and the third land 524, such as between the third outer surface 536 and the fourth outer surface 538. The fifth groove 546 may be located about and depress into the third section 386. The fifth groove 546 may curve radially about and depress in a radial direction toward the axis 410. The fifth groove 546 may curve with the curvature of the second land 522 and/or the third land 524, such as with the curvature of the third outer surface 536 and/or fourth outer surface 538.

The sixth groove 548 may be positioned longitudinally between the fifth groove 546 and a seventh groove 550. The third land 524 may include the sixth groove 548, wherein the sixth groove 548 may be located about and depress into the material of the third land. The sixth groove 548 may depress into the fourth outer surface 538. The sixth groove 548 may divide the fourth outer surface 538, such as separating the fourth outer surface 538 into two separate sections. The sixth groove 548 may be located radially about and depress in a radial direction toward the axis 410 through the axis 410. For example, the sixth groove 548 may depress into the fourth outer surface 538 in a radial direction toward the axis 410.

The seventh groove 550 may be positioned longitudinally between the third land 524 and the fourth land 526, such as between the fourth outer surface 538 and the fifth outer surface 540. The seventh groove 550 may be located about and depress into the third section 386. The seventh groove 550 may curve radially about and depress in a radial direction toward the axis 410. The seventh groove 550 may curve with the curvature of third land 524 and/or the fourth land 526, such as with the curvature of the fourth outer surface 538 and/or fifth outer surface 540.

The eighth groove 552 may be positioned longitudinally between the fourth land 526 and the fifth land 528. The eighth groove 552 may be located about and depress into the third section 386. The eighth groove 552 may curve radially about and depress in a radial direction toward the axis 410. The eighth groove 552 may curve with the curvature of fourth land 526 and/or fifth land 528.

The ninth groove 554 may be positioned longitudinally between the fifth land 528 and the sixth land 530. The ninth groove 554 may be located about and depress into the third section 386. The ninth groove 554 may curve radially about and depress in a radial direction toward the axis 410. The ninth groove 554 may curve with the curvature of fifth land 528 and/or sixth land 530.

The shaft 354 may be of a plurality of diameters, wherein features and components of the shaft 354 have different diameters from one another. The first section 382 may be of a first diameter 558 and a second diameter 560, where the second diameter 560 may be greater than the first diameter 558. The first diameter 558 and the second diameter 560 may be outer diameters for their respective portions of the first section 382. The portion of the first section 382 that includes the first outer surface 532 may be of the first diameter 558. Likewise, the first land 422 may be of the second diameter 560.

The second section 384 may be of a third diameter 562 and a fourth diameter 564 that are each different distances. The shoulder 388 may be of the third diameter 562. The portion of the second section 384 that has the second outer surface 534 may be of the fourth diameter 564. The fourth diameter 564 may be an outer diameter for the second outer surface 534. The third diameter 562 may a greater distance than the fourth diameter 564. The fourth diameter 564 may be a greater distance than the second diameter 560 and first diameter 558.

The third section 386 may be of a fifth diameter 566, a sixth diameter 568, a seventh diameter 570, an eighth diameter 572, and a ninth diameter 574 that each are of different distances from one another. The second land 522 may be of the fifth diameter 566. The third land 524 may be of the sixth diameter 568. The fourth land 526 may be of the seventh diameter 570. The fifth land 528 may be of an eighth diameter 572. The sixth land 530 may be of a ninth diameter 574. The fourth diameter 564 may be a greater distance than the fifth diameter 566, the sixth diameter 568, the seventh diameter 570, the eighth diameter 572, and the ninth diameter 574. The fifth diameter 566 may be a greater distance than the sixth diameter 568, the seventh diameter 570, the eighth diameter 572, and the ninth diameter 574. The sixth diameter 568 may be a greater distance than the seventh diameter 570, the eighth diameter 572, and the ninth diameter 574. The seventh diameter 570 may be a greater distance than the eighth diameter 572 and the ninth diameter 574. The eighth diameter 572 may be a greater distance than the ninth diameter 574.

The shaft 354 may include a plurality of holes that may be the distribution holes described with respect to FIG. 3 above. The shaft 354 may include at least a first hole 582 and a second hole 584. The first section 382 may include the first hole 582 and the third section 386 may include the second hole 584. The first outer surface 532 may include and be flush with the first hole 582, and the third outer surface 536 may include and be flush with the second hole 584. There may also be a plurality of first holes 582 and second holes 584. For example, there may be an additional hole of the first hole 582 on the opposite side of the shaft 354 from the third view 400, where the additional hole mirrors and is symmetrical to the first hole 582 with respect to the axis 410. For some examples, there may be an additional hole arranged opposite from the second hole 584, where the additional hole mirrors and is symmetrical to second hole 584 with respect to the axis 410. A hole symmetrical to the first hole 582 may be referred to herein as the first hole 582, and in such cases there may be a plurality of first holes 582. A hole symmetrical to the second hole 584 may be referred to herein as the second hole 584, and in such cases there may be a plurality of second holes 584.

The second section 384 may include a plurality of third holes 586 and a plurality of fourth holes 588. The second outer surface 534 may include and be flush with the third holes 586 and the fourth holes 588. The third holes 586 may be separated from the fourth holes 588 via the axis 410. For this example, the third holes 586 may be in a positive x direction from the fourth holes 588 with respect to the reference axes 201. There may be at least a pair of the third holes 586 visible from the fourth view 500. There may be at least a pair of the fourth holes 588 visible from the fourth view 500. There may be additional third holes 586 from those shown in the fourth view 500, such as on the opposite side of the second section 384 in the negative z direction from the fourth view 500. Likewise, there may be additional fourth holes 588 from those shown in the fourth view 500, such as on the opposite side of the second section 384 in the negative z direction from the fourth view 500. The line 512 may intersect with the third holes 586 and fourth holes 588. The line may 512 may divide the third holes 586 and fourth holes 588 into approximately symmetrical halves.

Turning to FIG. 6, it shows a fifth view 600 of the shaft 354. The fifth view 600 shows the shaft 354 isolated from other components and features of the assembly 202 of FIGS. 2-3. The fifth view 600 is also a side view of the shaft 354. The fifth view 600 is taken from a view normal to a lateral axis of shaft 354. For an example, the x axis of the reference axes 201 may be normal to and negative to the fifth view 600.

The fifth view 600 shows that the second section 384 has at least a fifth hole 622. The second outer surface 534 may include and be flush with the fifth hole 622. The second section 384 may include a plurality of fifth holes 622, such that the second outer surface 534 may include and be flush with a plurality of fifth holes 622. For example, there may be an additional hole of the fifth holes 622 on the opposite side of the second section 384 from and in the negative x direction of the fourth view 500, with respect to the reference axes 201. The line 512 may intersect with the fifth holes 622. The line may 512 may divide the fifth holes 622 into approximately symmetrical halves.

Turning to FIG. 7, it shows a sixth view 700. The sixth view 700 shows the shaft 354 isolated from other components and features of the assembly 202 of FIGS. 2-3. The sixth view 700 is also a second sectional view, taken on line 412 of FIGS. 4-6. The sixth view 700 is taken normal to a lateral axis of the shaft 354. For an example, the x axis of the reference axes 201 may be normal to and negative to the sixth view 700.

The sixth view 700 may show a first area 712 and a second area 714. The first area 712 and the second area 714 may be used for additional isolated views, such as views in FIG. 9 and FIG. 10 described below. A first hole of the first holes 582 and portions of the first land 422, the wall 424, the fourth groove 544, and the third passage 390 may be included in the first area 712. Likewise, a second hole of the second holes 584 and portions of the wall 424, the second land 522, the third land 524, the second outer surface 534, the fifth groove 546, the sixth groove 548, and the third passage 390 may be included in the second area 714.

The third passage 390 may include and comprise a plurality of sections that are of different volumes and shapes from one another. The sections of the third passage 390 may be referred to as regions for clarity and to avoid confusion with the first section 382, the second section 384, and the third section 386. The third passage 390 includes a first region 722, a second region 724, a third region 726, a fourth region 728, and a fifth region 730. The first section 382 may include the first region 722, the second region 724, and the third region 726. The first section 382, second section 384, and third section 386 may be located about and include portions of the fourth region 728. The fourth region 728 may be a fourth length 732. The second section 384 and third section 386 may be located about and include portions of the fifth region 730. The third passage 390 may not have tubes or tubing that are separate components from the structure of the shaft 354. The third passage 390 may distribute fluid to the outer surfaces of the shaft 354 without tubes or tubing that are separate components from the structure of the shaft 354.

The first region 722, the second region 724, the third region 726, the fourth region 728, and the fifth region 730 may each be defined and shaped by a surface. The surfaces may be inner surfaces of the shaft 354. For example, the first inner surface 432 may be positioned about and form the volumetric shape of the first region 722. The second inner surface 434 may be positioned about and form the volumetric shape of the second region 724. A third inner surface 736 may be positioned about and form the volumetric shape of the third region 726. A fourth inner surface 738 may be positioned about and form the volumetric shape of the fourth region 728. A fifth inner surface 740 may be positioned about and form the volumetric shape of the fifth region 730. The fifth inner surface 740 may be the third inner surface 436 of FIG. 4. The volumetric shape of the first region 722, the third region 726, and the fifth region 730 may be cylindrical in shape. The volumetric shape of the second region 724 and the fourth region 728 may be a more complex shape, such as a plurality of cylinders of volumes arranged in a compound shape. Features such as a splines 462 that are included by or attached to the second inner surface 434 may define the shape of the volume of the second region 724. Likewise, features such as scallops that are included by the fourth inner surface 738 may define the shape of the volume of the fourth region 728.

The interior dimensions of the passage 390 may vary along the length of the shaft 354. The passage 390 may have a plurality of diameters, including a plurality different diameters of different distances. The first region 722, the second region 724, the third region 726, the fourth region 728, and the fifth region 730 may each have different diameters. The first region 722 may be a first inner diameter 742. The second region 724 may be a second inner diameter 744. The third region 726 may be a third inner diameter 746. The fourth region 728 may be a fourth inner diameter 748. The fifth region 730 may be a fifth inner diameter 750. For an example the first inner diameter 742 may be of a distance that is greater than the distances of the second inner diameter 744, the fourth inner diameter 748, and the fifth inner diameter 750. The first inner diameter 742 may be variable in distance, wherein the first inner diameter 742 may change distances. The first inner diameter 742 may be at a maximum distance on the start of the first countersink 442 nearest to the first end 504 of the shaft 354. The first inner diameter 742 may be at a minimum distance at positions closer to the second end 506 from the first countersink 442. The first inner diameter 742 may have a distance that is greater than or equal to the distance of the third inner diameter 746. The third inner diameter 746 may be of a distance that is greater than the distances of the second inner diameter 744, the fourth inner diameter 748, and the fifth inner diameter 750. The second inner diameter 744 may be a distance that is greater than the distance of the fifth inner diameter 750. The fourth inner diameter 748 may be a distance that is greater than the distance of the fifth inner diameter 750. The second inner diameter 744 may vary in distance. The fourth inner diameter 748 may vary in distance.

For an example, the second inner diameter 744 may vary in a first way, such as longitudinally between a start and at an end of the second countersink 444. The second inner diameter 744 may decrease in distance at longitudinal positions further from the first end 504. The second inner diameter 744 may be at a first maximum distance on the start of the second countersink 444 nearest to the first end 504 of the shaft 354. The second inner diameter 744 may be at a first minimum distance at positions closer to the second end 506 from the second countersink 444. The second inner diameter 744 may also vary in a second way, such as radially about the axis 410 with the splines 462. For example, the second inner diameter 744 may be at a second maximum diameter between each of the splines 462. The second inner diameter 744 may be at a second minimum diameter at the highest point of each of the splines 462, where highest is relative to and a position closest to the axis 410. The second maximum diameter and the first maximum diameter may be equal for the second inner diameter 744. Likewise, the fourth inner diameter 748 and may be a greater distance than the distance of the second inner diameter 744 at a first set of positions about the fourth inner surface 738, an equal distance to the distance of the second inner diameter 744 at a second set of positions about the fourth inner surface 738, and a lesser distance to the distance of the second inner diameter 744 at a third set of positions about the second inner surface 434. The fourth inner surface 738 may have a scalloped section 762, where the scalloped section 762 is a scalloped shaped portion of the shaft 354. The scalloped portion may be defined as a section of the shaft that comprises at least a repeating pattern of a plurality of rounded or curved recesses in shape, such as half circular recesses. The scalloped section 762 may include a plurality of recess types, where each recess type may have different dimensions, such as radii, from other recess types. The recesses may be referred to alternatively as scallops. All recesses may be positioned symmetrically from one another, where each recess of a recess type may be symmetrical relative to the recesses of that type. The recesses of the scalloped portion may be positioned radially about a central axis or a centerline of the shaft and the volume. The scallops may alternate in a sequence about the centerline of the central cavity or central passage.

The scalloped section 762 may be a lubricant distributor, such as an oil distributor, that may direct oil from the third passage 390 to the exterior 404 and outer surfaces of the shaft 354. The scalloped section 762 is formed from the shaft, such as via casting or machining. The scalloped section 762 may be of the fourth length 732. The scalloped section 762 may have a plurality of recesses. Each of the recesses may each have a radius that extends into and creates volumes that portions of the fourth inner surface 738 may curve about. The scalloped section 762 may be positioned radially about the fourth region 728 and radially within the fourth inner surface 738. The scalloped section 762 may include a plurality of recesses of a plurality of recess types. Each recess type may have different dimensions, such as having different radii. The recesses may be scalloped recesses (e.g., scallops), such as in the example of the shaft 354 shown in FIG. 7. However, it is to be appreciated some or all of the recesses may be another type of recess from a scallop. A recess or recesses included by the scalloped section 762 may be alternatively referred to as scallops herein. Additionally, an individual recess or a recess type may be alternatively referred to herein as a scallop or a scallop type, respectively.

A fluid distribution system includes scalloped section 762 and the distribution holes of the shaft 354, such as the first holes 582, the second holes 584, the third holes 586, the fourth holes 588, and the fifth holes 622 of FIGS. 5-6. The first holes 582, the second holes 584, the third holes 586, the fourth holes 588, and the fifth holes 622 are open to the outer surfaces of the shaft 354, and therein may be outer distribution holes. Additionally, the fluid distribution system includes a plurality of distribution holes that are inner distribution holes, wherein the inner distribution holes are open to the inner surfaces of the shaft 354. Distribution holes that are inner distribution holes may include a plurality of sixth holes 772, a plurality of seventh holes 774, a plurality of eighth holes 776, a plurality of ninth holes 778, and a plurality of tenth holes 782. It is to be appreciated that the ninth holes 778 are not shown in FIG. 7 and may be shown in FIG. 8. The ninth holes 778 may mirror the eighth holes 776 on the scalloped section 762 on the opposite the axis 410. Each of the outer distribution holes are complementary an inner distribution hole, such that the inner distribution hole is in fluid communication with the outer distribution hole. For example, each inner distribution hole may be in fluid communication with a complementary outer distribution hole via a fluid passage or a plurality of fluid passages. For example, the sixth holes 772 are complementary to and may be in fluid communication with the first holes 582. The seventh holes 774 are complementary to and may be in fluid communication with the second holes 584. The eighth holes 776 are complementary to and may be in fluid communication with the third holes 586. The ninth holes 778 are complementary to and may be in fluid communication with the fourth holes 588. The tenth holes 782 are complementary to and may be in fluid communication with the fifth holes 622. For this example, the sixth holes 772, the seventh holes 774, the eighth holes 776, the ninth holes 778, and the tenth holes 782 may have openings that are flush and contiguous with the fourth inner surface 738 and features of the scalloped section 762. The scalloped section 762 may therein direct fluid from the fourth inner surface 738 and the third passage 390 to the sixth holes 772, the seventh holes 774, the eighth holes 776, the ninth holes 778, and/or the tenth holes 782.

The inner distribution holes, such as the sixth holes 772, the seventh holes 774, the eighth holes 776, the ninth holes 778, and the tenth holes 782, are aligned with the scalloped section 762, such that fluid may pass from the scalloped section 762 to the inner distribution holes via an opening. For example, an opening of each of the inner distribution holes may be flush and contiguous with a surface of a recess of the scalloped section 762. Fluid may pass from scalloped section 762 to the outer surfaces of the shaft 354 and the exterior 404 via the distribution holes. The inner distribution holes, including the sixth holes 772, the seventh holes 774, the eighth holes 776, the ninth holes 778, and the tenth holes 782, may not be fluidly coupled or in fluid communication with tubes or tubing that are separate components from the structure of the shaft 354. The inner distribution holes may receive fluid without the fluid flowing from tubes or tubing that are separate components from the structure of the shaft 354.

Additionally, each of the distribution holes shown on the outer surfaces of the shaft 354 and each of the distribution holes shown on the inner surfaces of the third passage 390 may each be complementary to a fluid passage. In other words, distribution holes on the inner surface and distribution holes on the outer surface may be openings to complementary fluid passages. A fluid passage may place a complementary hole on the inner surfaces in fluid communication with the complementary hole on the outer surfaces, where each complementary hole may be in fluid communication via at least a single fluid passage. The aforementioned passages that may place distribution holes in fluid communication may be referred to as distribution passages or distributor passages herein. For example, the first holes 582 and sixth holes 772 may be complementary to a plurality of first distribution passages 784, wherein each of the first holes 582 and each of the sixth holes 772 are placed in fluid communication via a first passage of the first distribution passages 784. The first holes 582 may be openings to the first distribution passages 784 at the first outer surface 532 that may be flush and contiguous with first outer surface 532. Likewise, the sixth holes 772 may be openings to the first distribution passages 784 to the third passage 390 that are flush and contiguous with a surface of a recess of the scalloped section 762. Additionally, the second holes 584 and seventh holes 774 may be complementary to a plurality of second distribution passages 786, wherein each of the second holes 584 and each of the seventh holes 774 are placed in fluid communication via a second passage of the second distribution passages 786. The second holes 584 may be openings to the second distribution passages 786 at the third outer surface 536 that may be flush and contiguous with third outer surface 536. Likewise, the seventh holes 774 may be openings to the second distribution passages 786 to the third passage 390 that are flush and contiguous with a surface of a recess of the scalloped section 762.

The distance of the fourth inner diameter 748 may vary with the plurality of scallops of the scalloped section 762. The fourth inner diameter 748 may be at a maximum where the radius is at a maximum for a first type of scallop of the scalloped section 762. The fourth inner diameter 748 may be at a minimum at portions of the fourth inner surface 738 at the spaces between each of the scallops of the scalloped section 762. The first area 712 and second area 714 may each include portions of the scalloped section 762.

Turning to FIG. 8, it shows a seventh view 800. The seventh view 800 is a sectional view showing the shaft 354 isolated from other components and features of the assembly 202 of FIGS. 2-3. The seventh view 800 may be taken on line 512 of FIGS. 4-6. The seventh view 800 is normal to the longitudinal axis of the shaft 354, such as axis 410. For an example, the y axis of the reference axes 201 may be normal to and positive to the sixth view 700.

The seventh view 800 shows the shaft 354 may have a plurality of additional axes, of which features and components included by the shaft may be centered about. For example, the shaft 354 may have a second axis 812, a third axis 814, a fourth axis 816, a fifth axis 818, and a sixth axis 820. The second axis 812, the third axis 814, the fourth axis 816, the fifth axis 818, and the sixth axis 820 are not parallel with the axis 410. The second axis 812 may intersect with the axis 410, and the second axis 812 may be lateral with respect the shaft 354. The third axis 814, the fourth axis 816, the fifth axis 818, and the sixth axis 820 may be positioned about the first axis 410. For an example of an embodiment of the shaft 354, the third axis 814, the fourth axis 816, the fifth axis 818, and the sixth axis 820 may not intersect the first axis 410. The third axis 814 and fourth axis 816 may be parallel. Likewise, the fifth axis 818 and sixth axis 820 may be parallel. The third axis 814 and fourth axis 816 may intersect with the fifth axis 818 and sixth axis 820. The third axis 814 and fourth axis 816 may be perpendicular to the fifth axis 818 and sixth axis 820.

The seventh view 800 shows the ninth holes 778. The ninth holes 778 may mirror the eighth holes 776 on the scalloped section 762 on the opposite the axis 410. The ninth holes 778 are complementary to and may be in fluid communication with the fourth holes 588.

A plurality of the fifth holes 622 and the tenth holes 782 of FIG. 6 may be centered about the second axis 812, such that the centerlines of the fifth holes 622 and the tenth holes 782 may be approximately collinear with the second axis 812. A plurality of the third holes 586 and the eighth holes 776 of FIG. 6 may be centered about the third axis 814, the fourth axis 816, the fifth axis 818, and the sixth axis 820, such that the centerlines of the third holes 586 and the eighth holes 776 may be approximately collinear with the aforementioned axes. A plurality of the fourth holes 588 of FIG. 5 and a plurality of the ninth holes 778, may be centered about the third axis 814, the fourth axis 816, the fifth axis 818, and the sixth axis 820, such that the centerlines of the fourth holes 588 and the ninth holes 778 may be approximately collinear with the aforementioned axes.

A first plurality of the third holes 586 and the eighth holes 776 may be complementary to a plurality of third distribution passages 824, where each of the third holes 586 and the eighth holes 776 are placed in fluid communication via a passage of the third distribution passages 824. The third holes 586 and the eighth holes 776 may be openings to the third distribution passages 824. The third holes 586 may be openings on opposite ends of the third distribution passages 824 from the eighth holes 776. Additionally, a second plurality of the third holes 586 and the eighth holes 776 may be complementary to a plurality of fourth distribution passages 826, where each of the third holes 586 and the eighth holes 776 are placed in fluid communication via a passage of the fourth distribution passages 826. The third holes 586 and the eighth holes 776 may be openings to the fourth distribution passages 826. The third holes 586 may be openings on opposite ends of the fourth distribution passages 826 from the eighth holes 776.

A first plurality of the fourth holes 588 and the ninth holes 778 may be complementary to a plurality of fifth distribution passages 828, where each of the fourth holes 588 and the ninth holes 778 are placed in fluid communication via a passage of the fifth distribution passages 828. The fourth holes 588 and the ninth holes 778 may be openings to the fifth distribution passages 828. The fourth holes 588 may be openings on opposite ends of the fifth distribution passages 828 from the ninth holes 778. Additionally, a second plurality of fourth holes 588 and the ninth holes 778 may be complementary to a plurality of sixth distribution passages 830, where each of the fourth holes 588 and the ninth holes 778 are placed in fluid communication via a passage of the sixth distribution passages 830. The fourth holes 588 and the ninth holes 778 may be openings to the sixth distribution passages 830. The fourth holes 588 may be openings on opposite ends of the sixth distribution passages 830 from the ninth holes 778.

The tenth holes 782 may be placed in fluid communication with the fifth holes 622 via a plurality of seventh distribution passages 822, where each of tenth holes 782 and fifth holes 622 may be placed in fluid communication via a passage of the seventh distribution passages 822. The tenth holes 782 and fifth holes 622 may be openings to the seventh distribution passages 822. The tenth holes 782 may be openings on opposite ends of the seventh distribution passages 822 from the fifth holes 622.

The third distribution passages 824, the fourth distribution passages 826, the fifth distribution passages 828, the sixth distribution passages 830, and the seventh distribution passages 822 may be positioned approximately radially about the third passage 390. The third distribution passages 824 may be positioned symmetrically from one another. The fourth distribution passages 826 may be positioned symmetrically from one another. The fifth distribution passages 828 may be positioned symmetrically from one another. The sixth distribution passages 830 may be positioned symmetrically from one another. The seventh distribution passages 822 may be positioned symmetrically from one another. On the second side 408, the distribution passages may alternate between the third distribution passages 824, the fourth distribution passages 826, and the seventh distribution passages 822. The fourth distribution passages 826 may be positioned closest to the seventh distribution passages 822 relative to the third distribution passages 824. On the first side 406, the distribution passages may alternate in sequence between the fifth distribution passages 828, the sixth distribution passages 830, and the seventh distribution passages 822. The sixth distribution passages 830 may be positioned closest to the seventh distribution passages 822 relative to the fifth distribution passages 828. The third distribution passages 824 and the fourth distribution passages 826 may be of approximately the same dimensions. The each of the third distribution passages 824 and each of the fourth distribution passages 826 may be adjacent and mirrored with respect to a space between. The fifth distribution passages 828 and the sixth distribution passages 830 may be of approximately the same dimensions. The each of the fifth distribution passages 828 and each of the sixth distribution passages 830 may be adjacent and mirrored with respect to a space between.

As an example embodiment, there may be at least a pair of the fifth holes 622 and a pair of the tenth holes 782. The fifth holes 622 may include a first fifth hole 622*a* and a second fifth hole 622*b*. The tenth holes 782 may include a first tenth hole 782*a* and a second tenth hole 782*b*. The first fifth hole 622*a* and the first tenth hole 782*a* may be on and closest to the first side 406. The second fifth hole 622*b* and second tenth hole 782*b* may be on and closest to the second side 408. Likewise, there may be four of the third holes 586 and eighth holes 776. There may be four of the fourth holes 588 and the ninth holes 778. Each of the third holes 586 may be on or closest to the second side 408 from the fourth holes 588. Likewise, each of the fourth holes 588 may be on or closest to the first side 406 from the third holes 586. The third holes 586 may include a first third hole 586*a*, a second third hole 586*b*, a third third hole 586*c*, and a fourth third hole 586*d*. The fourth holes 588 may include a first fourth hole 588*a*, a second fourth hole 588*b*, a third fourth hole 588*c*, and a fourth fourth hole 588*d*. The eighth holes 776 may include a first eighth hole 776*a*, a second eighth hole 776*b*, a third eighth hole 776*c*, and a fourth eighth hole 776*d*. The ninth holes 778 may include a first ninth hole 778*a*, a second ninth hole 778*b*, a third ninth hole 778*c*, and a fourth ninth hole 778*d*.

The first third hole 586*a* and the first eighth hole 776*a* may be centered about the fifth axis 818. The third fourth hole 588*c* and third ninth hole 778*c* may be centered about the fifth axis 818. The second third hole 586*b* and the second eighth hole 776*b* may be centered about the sixth axis 820. The fourth fourth hole 588*d* and the fourth ninth hole 778*d* may be centered about the sixth axis 820. The third third hole 586*c* and the third eighth hole 776*c* may be centered about the fourth axis 816. The first fourth hole 588*a* and the first ninth hole 778*a* may be centered about the fourth axis 816. The fourth third hole 586*d* and the fourth eighth hole 776*d* may be centered about the third axis 814. The second fourth hole 588*b* and the second ninth hole 778*b* may be centered about the third axis 814.

The scalloped section 762 includes a plurality of types of scallops. For an example, the scalloped section 762 may include a plurality of first scallops 832 and second scallops 834. Each of the first scallops 832 may be equidistant from one another. Likewise, each of the second scallops 834 may be equidistant from one another. For an example embodiment, the first scallops 832 may not be in fluid communication via a distribution hole. For this example, the second scallops 834 may be in fluid communication via a distribution hole, such as the tenth holes 782. The first fifth hole 622*a* may fluidly couple to a second scallop of the second scallops 834 that is nearest to the first side 406 from the axis 410. Likewise, the second fifth hole 622*b* may fluidly couple to a second scallop of the second scallops 834 that is nearest to the second side 408 from the axis 410. There may be at least a pair of the first scallops 832 and a pair of the second scallops 834. When there are at least a pair of first scallops 832, each of the first scallops 832 may be positioned opposite to one another. Likewise, when there are at least a pair of second scallops 834, each of the second scallops 834 may be positioned opposite to one another. For this example, the first scallops 832 may be arranged vertically, such that a vertical line, e.g., a line parallel with the z-axis, may intersect both of the first scallops 832. Likewise, the second scallops 834 may be arranged laterally, such that a lateral line, e.g., a line parallel with the x-axis, may intersect both of the second scallops 834.

The scalloped section 762 may also include a plurality of third scallops 836 and a plurality of fourth scallops 838. The third scallops 836 may be positioned nearest to the second side 408 from the axis 410. Likewise, the fourth scallops 838 may be positioned nearest to the first side 406 from the axis 410. The third scallops 836 and fourth scallops 838 may be positioned radially about the axis 410. The third scallops 836 may be positioned between the first and second scallops 832, 834. The fourth scallops 838 may be positioned between the first and second scallops 832, 834.

The spacing of material between the scallops may vary. For example, the fourth inner diameter 748 may vary with the spacing of the material between different types of scallops. Each of a first spacing between the first scallops 832 and the third scallops 836 or fourth scallops 838 may include a first flank 846. There may be a plurality of first flanks 846, wherein there may be a pair of first flanks 846 about each of the first scallops 832. Each of a second spacing between the second scallops 834 and the third scallops 836 or fourth scallops 838 may include a second flank 848. There may be a plurality of second flanks 848, wherein there may be a pair of second flanks 848 about each of the second scallops 834. The first flanks 846 and second flanks 848 may extend the longitudinal length of the first scallops 832 and second scallops 834, respectively. Each of a third spacing between each of the third scallops 836 may include a first fin 842. Each of a fourth spacing between each of the fourth scallops 838 may include a second fin 844. There may be a plurality of the first fins 842 and the second fins 844. The first fins 842 and second fins 844 may extend the longitudinal length of the third scallops 836 and fourth scallops 838, respectively. The fourth inner diameter 748 may be of a first distance at the first flanks 846 that is less than the distances of the fourth inner diameter 748 at the surfaces of the scallops. The fourth inner diameter 748 may be of a second distance at the second flanks 848 that is less than the distances of the fourth inner diameter 748 at the surfaces of the scallops. The fourth inner diameter 748 may be of a third distance at the first fins 842 that is less than the distances of the fourth inner diameter 748 at the surfaces of the scallops. The fourth inner diameter 748 may be of a fourth distance at the second fins 844 that is less than the distances of the fourth inner diameter 748 at the surfaces of the scallops. The fourth inner diameter 748 may be at the same distance at positions at the surface of the first flanks 846 as positions at the surface of the second flanks 848. The fourth inner diameter 748 may be at the same distances at positions at the surface of the first fins 842 as positions at the surface of the second fins 844. The fourth inner diameter 748 may be a greater distance at the first and second spacing about the first scallops and second scallops compared to at the third spacing between the third scallops and fourth spacing between the fourth scallops. For example, the first distance and second distance of the fourth inner diameter 748 at the first and second flanks 846, 848 may be greater than the third distance and fourth distance of the fourth inner diameter 748 at the first and second fins 842, 844.

The first scallops 832, second scallops 834, third scallops 836, and fourth scallops 838 may be curved and partially-cylindrical in shape, such as semi-cylindrical in shape. The curves of the first scallops 832, second scallops 834, third scallops 836, and fourth scallops 838 may be smooth with a low coefficient of friction. The first fins 842 may extend in a radial direction inward from the curvature of the third scallops 836 toward the axis 410. The second fins 844 may extend in a radial direction inward from the curvature of the fourth scallops 838 toward the axis 410.

The scallops may alternate in a sequence about the centerline of the central cavity or central passage. As an example of an embodiment, nearest to the first side 406 from the axis 410, the scalloped section 762 may alternate between a first scallop of the first scallops 832, a first set of the fourth scallops 838, a second scallop of the second scallops 834, a second set of the fourth scallops 838, and another first scallop of the first scallops 832. Likewise, nearest to the second side 408 from the axis 410, the scalloped section 762 may alternate between a first scallop of the first scallops 832, a first set of third scallops 836, a second scallop of the second scallops 834, a second set of third scallops 836, and another first scallop of the first scallops 832.

Each of the third scallops 836 may fluidly couple to a hole of the third holes 586. Each of the third holes 586 may have an opening that is flush and contiguous with the surface of a complementary scallop of the third scallops 836. Additionally, each of the fourth scallops 838 may fluidly couple to a hole of the fourth holes 588. Each of the fourth holes 588 may have an opening that is flush and contiguous with the surface of a complementary scallop of the fourth scallops 838. For an example embodiment, the first third hole **586*a* and second third hole 586*b* may each fluidly couple and have an opening flush with surfaces of the third scallops 836 positioned nearest to the top of the shaft 354. The third third hole 586*c* and fourth third hole 586*d* may each fluidly couple and have an opening flush with surfaces of the third scallops 836 positioned nearest to the bottom of the shaft 354. The first fourth hole 588*a* and the second fourth hole 588*b* may each fluidly couple and have an opening flush with surfaces of the fourth scallops 838 positioned nearest to the top of the shaft 354. The third fourth hole 588*c* and fourth fourth hole 588*d* may each fluidly couple and have an opening flush with surfaces of the fourth scallops 838 positioned nearest to the bottom of the shaft 354**.

The scalloped section 762 may have a set quantity of second recesses positioned at the circumference between a plurality of first recesses, or a plurality of first recesses and third recesses. For an example embodiment, there may be two of the third scallops 836 in a set of the third scallops 836. Likewise, there may be two of the fourth scallops 838 in a set of the fourth scallops 838. A set of the third scallops 836 may be positioned at the circumference of the scalloped section between a scallop of the first scallops 832 and a scallop of the second scallops 834. A set of the fourth scallops 838 may be positioned at the circumference of the scalloped section 762 between a scallop of the first scallops 832 and a scallop of the second scallops 834. The third scallops 836 may be positioned symmetrically from one another and symmetrically with the first scallops 832 and second scallops 834 about the circumference of the scalloped section 762. The fourth scallops 838 may be positioned symmetrically from one another and symmetrically with the first scallops 832 and second scallops 834 about the circumference of the scalloped section 762.

As an example, the third scallops 836 include a first third scallop **836*a* and a second third scallop 836*b*. The first third scallop 836*a* and second third scallop 836*b* may be nearest to the bottom of the shaft 354. The first third scallop 836*a* may be closest to a first scallop of the first scallops 832. The second third scallop 836*b* may be closest to a second scallop of the second scallops 834. The volumes of the first third scallop 836*a* and second third scallop 836*b* may be separated via a fin of the first fins 842. The fourth eighth hole 776*d* may be contiguous with the surfaces of the first third scallop 836*a*, with an opening flush with the surfaces of the first third scallop 836*a*. The third eighth hole 776*c* may be contiguous with the surfaces of the second third scallop 836*b*, with an opening flush with the surfaces of the second third scallop 836*b*. The first third scallop 836*a* and the second third scallop 836*b* may be centered about the fifth axis 818 and sixth axis 820 respectively. An additional set of the third scallops 836 may mirror the first third scallop 836*a* and the second third scallop 836*b* at the top of the shaft 354 over the second axis 812**.

For this or another example, the fourth scallops 838 include a first fourth scallop **838*a* and a second fourth scallop 838*b*. The first fourth scallop 838*a* and second fourth scallop 838*b* may be nearest to the bottom of the shaft 354. The first fourth scallop 838*a* may be closest to a first scallop of the first scallops 832. The second fourth scallop 838*b* may be closest to a second scallop of the second scallops 834. The volumes of the first fourth scallop 838*a* and the second fourth scallop 838*b* may be separated via a fin of the second fins 844. The fourth ninth hole 778*d* may be contiguous with the surfaces of the first fourth scallop 838*a*, with an opening flush with the surfaces of the first fourth scallop 838*a*. The third ninth hole 778*c* may be contiguous with the surfaces of the second fourth scallop 838*b*, with an opening flush with the surfaces of the second fourth scallop 838*b*. The first fourth scallop 838*a* and the second fourth scallop 838*b* may be centered about the fifth axis 818 and sixth axis 820 respectively. An additional set of the fourth scallops 838 may mirror the first fourth scallop 838*a* and the second fourth scallop 838*b* at the top of the shaft 354 over the second axis 812**.

The length of the first scallops 832, the second scallops 834, the third scallops 836, and the fourth scallops 838 may be longitudinal with respect to the shaft 354. The first scallops 832, the second scallops 834, the third scallops 836, and the fourth scallops 838 may share the same length, such as the fourth length 732. The first scallops 832 may have surfaces with a curvature of a first radius 852. The second scallops 834 may have surfaces with a curvature of a second radius 854. The third scallops 836 may have surfaces with a curvature of a third radius 856. The fourth scallops 838 may have surfaces with a curvature of a fourth radius 858. The first radius 852 may be greater in distance than the third and fourth radii 856, 858. The second radius 854 may be greater in distance than the third and fourth radii 856, 858. The first radius 852 and the second radius 854 may be of approximately the same distance. Likewise, the third radius 856 and fourth radius 858 may be of approximately the same distance. The tenth holes 782 may have a radius complementary to and contiguous with the second radius 854, such that the tenth holes 782 may be contiguous with the surfaces of the second scallops 834. The eighth holes 776 may have a radius complementary to and contiguous with the third radius 856, such that the eighth holes 776 may be contiguous with the surfaces of the third scallops 836. The ninth holes 778 may have a radius complementary to and contiguous with the fourth radius 858, such that the ninth holes 778 may be contiguous with the surfaces of the fourth scallops 838.

Fluid may be driven out of the third passage 390 via a force, such as a centripetal force from the rotation of the shaft 354. Fluid that enters the volume of the second scallops 834, third scallops 836, and fourth scallops 838 may be driven radially outward and out of the third passage 390 via the force. The curvature of the second radius 854 and the force may drive fluid in the volume of the second scallops 834 to the tenth holes 782, such as the first and/or second tenth holes 782*a*, 782*b*. Fluid may be driven through the tenth holes 782 to the outer surfaces of the shaft 354 and the exterior 404, via the seventh distribution passages 822 and the fifth holes 622. Likewise, the curvature of the third radius 856 and the force may drive fluid in the volume of the third scallops 836 to the eighth holes 776. Fluid may be driven through the eighth holes 776 to the outer surfaces of the shaft 354 and the exterior 404, via the third distribution passages 824 or fourth distribution passages 826 and the third holes 586. Additionally, the curvature of the fourth radius 858 and the force may drive fluid in the volume of the fourth scallops 838 to the ninth holes 778. Fluid may be driven through the ninth holes 778 to the outer surfaces of the shaft 354 and the exterior 404 via fifth distribution passages 828 or sixth distribution passages 830 and the fourth holes 588.

Turning to FIG. 9 it shows an eighth view 900 of a portion of the shaft 354. The eighth view 900 may be taken on the first area 712, where the first area 712 is isolated from other components and features of the shaft 354.

The eighth view 900 shows each of the first holes 582, the sixth holes 772, and the first distribution passages 784 may be centered about a first centerline 922. The first centerline 922 may be a central axis that the first hole 582 may be positioned radially about and extend with. There may be a plurality of the first centerlines 922. Each of the first centerlines 922 may be a central axis that each of the first holes 582, the sixth holes 772, and the first distribution passages 784 may be positioned radially about and extend with. Each of the first centerlines 922 may extend at a first angle 920 from an axis 918. The first angle 920 may also extend from the first outer surface 532. The axis 918 may be parallel with the axis 410 of FIGS. 4-7 and the centerline of the shaft 354.

As outer openings, each of the first holes 582 may have a first edge 932 that may be contiguous and flush with the first outer surface 532. As inner openings, each of sixth holes 772 may have a second edge 934 that may be contiguous and flush with the fourth inner surface 738. The second edge 934 may be flush and contiguous with a portion of the scalloped section 762, such as at the surfaces of a scallop. As an example of an embodiment of the shaft 354, the second edge 934 may be flush and contiguous with surfaces a scallop of the first scallops 832 of FIG. 8. The second edge 934 may be complementary such as to curve and be contiguous with the radius of a scallop, such as the first radius 852 of FIG. 8. Fluid may leave the third passage 390 and the scalloped section 762 via the sixth holes 772. Fluid may travel through the first distribution passages 784 between the sixth holes 772 and the first holes 582. Fluid may exit the first distribution passages 784 via the first holes 582. Fluid may be distributed to the first outer surface 532 and the exterior 404 via the first holes 582.

A bearing or bearing assembly, such as the first bearing 360 of FIG. 3, may be positioned about the first holes 582. The bearing or bearing assembly may support the first outer surface 532, such as the regions about the first holes 582. The first holes 582 may therein direct work fluid, such as lubricant and/or coolant, from the scalloped section to a bearing or bearing assembly. The lubricant and/or coolant may be an oil.

There may be a plurality of first holes 582 and sixth holes 772 positioned radially about the third passage 390. There may be a plurality of first distribution passages 784 extending from the fourth inner surface 738 to the first outer surface 532 and positioned radially about the third passage 390. The first holes 582 may distribute fluid from the third passage to the first outer surface 532, the exterior 404, and a bearing or bearing assembly positioned about the first holes 582.

Turning to FIG. 10 it shows a ninth view 1000 of a portion of the shaft 354. The ninth view 1000 may be taken on the second area 714, where the second area 714 is isolated from other components and features of the shaft 354.

The ninth view 1000 shows that each of second holes 584, seventh holes 774, and the second distribution passages 786 may be centered about a second centerline 1022. There may be a plurality of the second centerlines 1022. Each of the second centerlines 1022 may be a central axis that each of the second holes 584, seventh holes 774, and the second distribution passages 786 may be positioned radially about and extend with. Each of the second centerlines 1022 may extend at a second angle 1020 from an axis 1018. The second angle 1020 may also extend from the first outer surface 532. The axis 1018 may be parallel with the axis 410 of FIGS. 4-7 and the centerline of the shaft 354.

As outer openings, each of the second holes 584 may have a third edge 1032 that may be contiguous and flush with the third outer surface 536. As inner openings, each of the seventh holes 774 may have a fourth edge 1034 that may be contiguous and flush with the fourth inner surface 738. The fourth edge 1034 may be flush and contiguous with a portion of the scalloped section 762, such as at the surfaces of a scallop. As an example of an embodiment of the shaft 354, the fourth edge 1034 may be flush and contiguous with surfaces of a scallop, such as a scallop of the first scallops 832 of FIG. 8. The fourth edge 1034 may be complementary, such as to curve and be contiguous with the radius of a scallop, such as the first radius 852 of FIG. 8. Fluid may leave the third passage 390 and the scalloped section 762 via the seventh holes 774. Fluid may travel through the second distribution passages 786 between the seventh holes 774 and second holes 584. Fluid may exit second distribution passages 786 via the second holes 584. Fluid may be distributed to the third outer surface 536 and the exterior 404 via the second holes 584.

A bearing or bearing assembly, such as the second bearing 362 of FIG. 3, may be positioned about the second holes 584. The bearing or bearing assembly may support the third outer surface 536, such as the regions about the second holes 584. The second holes 584 may therein direct work fluid, such as lubricant and/or coolant, from the scalloped section 762 to a bearing or bearing assembly. The lubricant and/or coolant may be an oil.

There may be a plurality of second holes 584 and seventh holes 774 positioned radially about the third passage 390. There may be a plurality of second distribution passages 786 extending from the fourth inner surface 738 to the third outer surface 536 and positioned radially about the third passage 390. The second holes 584 may distribute fluid from the third passage 390 to the third outer surface 536, the exterior 404, and a bearing or bearing assembly positioned about the second holes 584.

In this way, an oil distribution system may be included as a component and feature of a shaft, where the oil distribution system does not have tubes that are not comprised of the shaft. The oil distribution system may be a scalloped shaped oil distribution formed from or included by a rotor shaft. Alternatively, the oil distribution system may be a scalloped shaped oil distributor formed from or included a sleeve that may be rotationally coupled to a drive shaft, such as via physical coupling. The scalloped shaped oil distributor system may be formed of a plurality of recesses, with a plurality of recess types. Recess types may be curved recesses of varying radii. A first recess of a first type may have curvature of a first radius and a second recess of a second type may have a curvature of a second radius, where the first radius and the second radius are different distances. The recesses may be scalloped recesses, and may be referred to alternatively as scallops. A plurality of distribution holes aligned with the curvature of the recesses, such that the distribution holes may have an openings contiguous and flush with the recesses of complementary scallops. The distribution holes are complementary to a plurality of distribution passages (e.g., distributor passages), such that fluid entering the distribution hole may enter the distribution passage. Fluid, such as oil, may be transported via the distribution holes to the distribution passage from a scallop, and from the distribution holes to an exterior surface of the shaft via the distribution passage. The fluid passed through the distribution holes from the scallops may be used for lubrication, cooling, and temperature mitigation of components of the shaft and an electric machine assembly about the shaft.

As in another representation, an oil distribution system in an electric machine, comprising: a scalloped shaped oil distributor formed in a rotor shaft or a sleeve and including a plurality of curved recesses with varying radii; and a plurality of distribution passages formed in the rotor shaft and aligned with the curved recesses in the scalloped shaped oil distributor.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A lubrication distribution system comprising:

a shaft comprising a scalloped shaped portion including a plurality of scalloped recesses configured to receive fluid and distribute the fluid to bearings of a traction motor, where radii of the scalloped recesses vary; and a plurality of distribution holes positioned proximate a circumference of the scalloped shaped portion.

2. The lubrication distribution system of claim 1, where the shaft is a rotor for the traction motor.

3. The lubrication distribution system of claim 1, where the shaft is hollow and a sleeve about a hollow portion, and the hollow portion of the shaft includes the scalloped shaped portion, and the hollow portion does not include tubes that are fluidly coupled with the distribution holes.

4. The lubrication distribution system of claim 3, where the scalloped shaped portion includes at least a plurality of first recesses and a plurality of first distribution holes, where each of the first distribution holes has a radius that is contiguous with the radius of a complementary first recess of the first recesses.

5. The lubrication distribution system of claim 4, where each of the first distribution holes places the complementary first recess in fluid communication with an outer surface of the shaft.

6. The lubrication distribution system of claim 5, where each of the first distribution holes is complementary to a first distribution passage and a first outer hole, such that each of the first distribution holes and each of a plurality of first outer distribution holes are openings to the first distribution passage, and each of first recesses is in fluid communication with the outer surface via a complementary distribution passage of the first distribution passage.

7. The lubrication distribution system of claim 5, where each of the first recesses have a first length that is parallel with a longitudinal axis and a centerline of the shaft.

8. The lubrication distribution system of claim 7, where the scalloped shaped portion includes at least a plurality of second recesses, where the second recesses have a second length parallel with the first length, where the first recesses are of a first radius and the second recesses are of a second radius.

9. The lubrication distribution system of claim 8, where the scalloped shaped portion includes at least a plurality of second distribution holes, where each of the second distribution holes has a radius that is contiguous with the radius of a complementary second recess of the second recesses.

10. The lubrication distribution system of claim 9, where each of the second distribution holes places the complementary second recess in fluid communication with an outer surface of the shaft.

11. The lubrication distribution system of claim 10, where each of the second distribution holes is complementary a second distribution passage and a second outer hole, such that each of the second distribution holes and each of a plurality of second outer distribution holes are openings to each of a plurality of second distribution passages, to each of the second recesses, such that each of the second recesses is in fluid communication with the outer surface via the second distribution holes.

12. The lubrication distribution system of claim 9, where there is a plurality of third recesses, where the third recesses have a third length parallel with the first length, where the third recesses are of a third radius, where the third radius is a different distance than the second radius, and a third spacing between a third recess of the third recesses and a second recess of the second recesses is a greater distance than the second spacing.

13. The lubrication distribution system of claim 12, where the third radius is of a same distance as the first radius.

14. The lubrication distribution system of claim 12, where a set quantity of second recesses are positioned at the circumference of an inner surface between each of the first recesses and third recesses.

15. The lubrication distribution system of claim 14, where the set quantity of second recesses is a pair.

16. A traction motor system comprising:

a stator;

a rotor;

a plurality of bearings; and a shaft, where the shaft is a hollow shaft having a plurality of scalloped recesses positioned about an inner passage of the hollow shaft to receive fluid and distribute the fluid to the bearings of the traction motor, where radii vary with the scalloped recesses, the shaft further having a plurality of holes respectively leading from a respective scalloped recess to a respective passage through the shaft to an exterior of the shaft, where a radius of each hole corresponds to the radius of a scalloped shaped portion proximate the hole.

17. The traction motor of claim 16, where the scalloped shaped portion includes at least a plurality of first recesses, a plurality of second recesses, and a plurality of third recesses, where the first recesses are of a first radius, the second recesses are of a second radius, and the third recesses are of a third radius, where the second radius is a different dimension from the first radius and third radius.

18. The traction motor system of claim 17, where the first recesses are in fluid communication with a first outer surface via a plurality of first distribution holes, where each of the first distribution holes has a radius that is contiguous with the first radius, and the second recesses are in fluid communication with the first outer surface via a plurality of second distribution holes, where each of the second distribution holes has a radius that is contiguous with the second radius.

19. The traction motor system of claim 17, where the shaft supports the rotor, where the rotor is rotationally coupled to the shaft, and the shaft is supported by the bearings, where the bearings are positioned about outer surfaces of the shaft.

20. The traction motor system of claim 19, where the third recesses are in fluid communication with a plurality of outer surfaces via a plurality of third distribution holes, where the bearings are located about the outer surfaces and the bearings are lubricated and cooled from lubricant transported via the third distribution holes.

* * * * *